(12) United States Patent
Kato et al.

(10) Patent No.: US 8,177,672 B2
(45) Date of Patent: May 15, 2012

(54) DRIVING-FORCE TRANSMITTING APPARATUS FOR FOUR-WHEEL-DRIVE VEHICLE

(75) Inventors: Tadahiko Kato, Kosai (JP); Toshiyuki Miyachi, Kosai (JP)

(73) Assignee: Univance Corporation, Shizuoka (JP)

( * ) Notice: Subject to any disclaimer, the term of this patent is extended or adjusted under 35 U.S.C. 154(b) by 199 days.

(21) Appl. No.: 12/782,910

(22) Filed: May 19, 2010

(65) Prior Publication Data

US 2011/0082004 A1 Apr. 7, 2011

(30) Foreign Application Priority Data

Oct. 7, 2009 (JP) .................................. 2009-233279

(51) Int. Cl.
*F16H 37/08* (2006.01)
*F16H 48/06* (2006.01)

(52) U.S. Cl. ......... 475/198; 475/199; 475/221; 475/225

(58) Field of Classification Search .................. 475/198, 475/199, 221, 225
See application file for complete search history.

(56) References Cited

U.S. PATENT DOCUMENTS

| | | | | |
|---|---|---|---|---|
| 7,083,539 B2 * | 8/2006 | Bowen | ........................... | 475/205 |
| 2003/0125153 A1 * | 7/2003 | Kukucka et al. | .............. | 475/198 |
| 2005/0266950 A1 * | 12/2005 | Bowen | ........................... | 475/198 |
| 2010/0044138 A1 | 2/2010 | Marsh et al. | | |
| 2010/0094519 A1 | 4/2010 | Quehenberger et al. | | |
| 2011/0319213 A1 * | 12/2011 | Ekonen et al. | .................. | 475/86 |

FOREIGN PATENT DOCUMENTS

| | | |
|---|---|---|
| DE | 10 2008 002 844 | 11/2009 |
| DE | 10 2009 005 378 | 4/2010 |
| JP | 11-125279 | 5/1999 |
| WO | 2006/060139 | 6/2006 |
| WO | 2010/017881 | 2/2010 |
| WO | 2010/019641 | 2/2010 |

OTHER PUBLICATIONS

European Search Report dated Jan. 19, 2011 in corresponding European Patent Application No. 10165702.1.

* cited by examiner

*Primary Examiner* — Edwin A Young
(74) *Attorney, Agent, or Firm* — Wenderoth, Lind & Ponack, L.L.P.

(57) ABSTRACT

A driving-force transmitting device includes a first disengaging mechanism that disengages a driving force from an engine to a driving-force transmitting unit and a second disengaging mechanism having a synchronizing mechanism that disengages the driving force from a driving-force transmitting unit to a right-rear-wheel driving shaft. A change gear ratio between front wheels and rear wheels is constructed so that a driving-force transmitting unit side of the first disengaging mechanism rotates at a speed higher than that of an opposing side at the time of completion of synchronization of the second disengaging mechanism. In switching from a two-wheel drive mode to a four-wheel drive mode, synchronization of the second disengaging mechanism first starts to increase the rotation speed of the driving-force transmitting unit, and next connects the first disengaging mechanism when a rotation speed of the driving-force transmitting unit side of the first disengaging mechanism matches that of an opposing side.

19 Claims, 20 Drawing Sheets

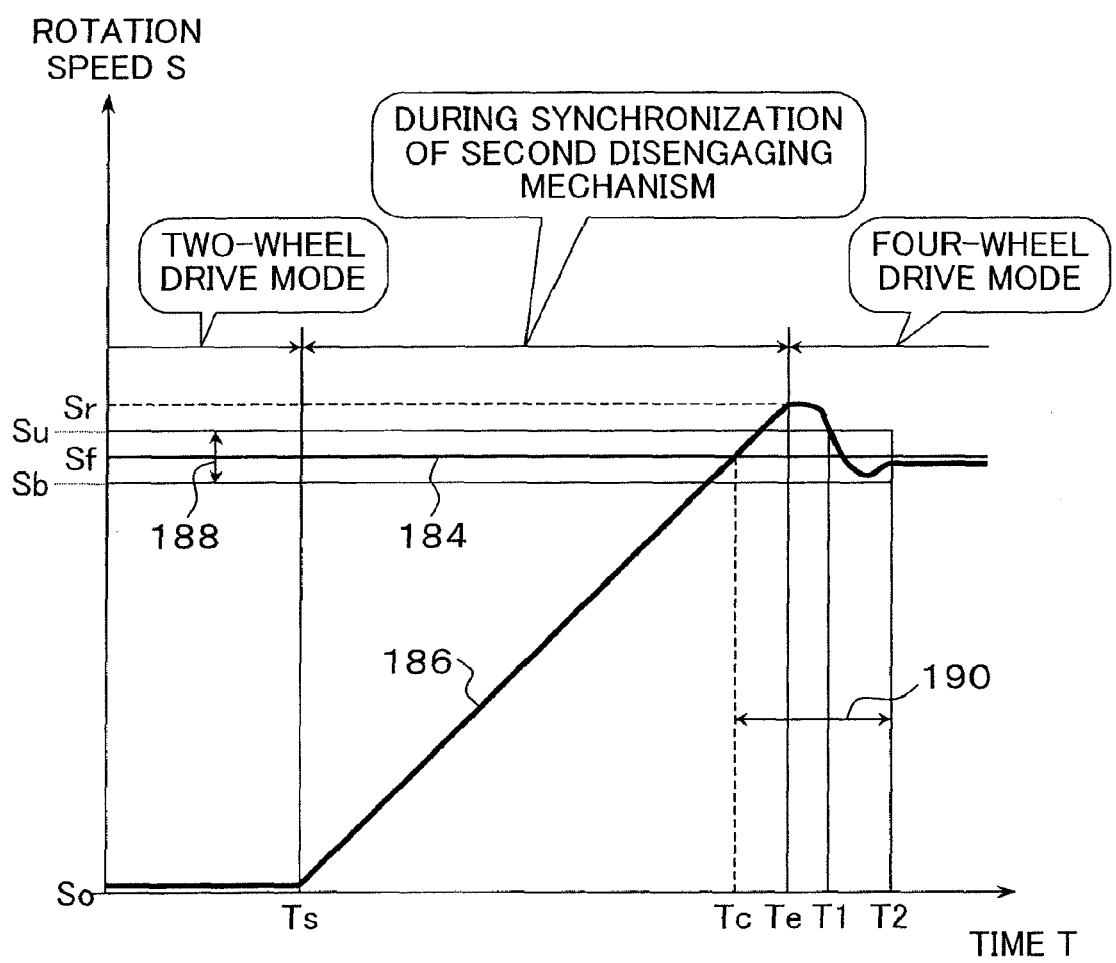

| DRIVING PATTERN | | | TIRE'S DYNAMIC RADIUS | | |
|---|---|---|---|---|---|
| CLASS | STATE | | FRONT WHEEL > REAR WHEEL | FRONT WHEEL = REAR WHEEL | FRONT WHEEL < REAR WHEEL |
| TIRE SLIP | FRONT WHEEL | LARGE | F>R | F>R | F>R |
| | | SMALL | F<R | F>R | F>R |
| | NONE | | F<R | F≒R | F>R |
| | REAR WHEEL | SMALL | F<R | F<R | F>R |
| | | LARGE | F≪R | F<R | F<R |
| CORNERING | FORWARD | | F<R | F≒R | F>R |
| | RADIUS | LARGE | F<R | F>R | F>R |
| | | SMALL | F>R | F>R | F>R |

F : FRONT-WHEEL-SIDE ROTATION SPEED
R : REAR-WHEEL-SIDE ROTATION SPEED

FIG. 10B

| DRIVING PATTERN | | | TIRE'S DYNAMIC RADIUS | | |
|---|---|---|---|---|---|
| CLASS | STATE | | FRONT WHEEL > REAR WHEEL | FRONT WHEEL = REAR WHEEL | FRONT WHEEL < REAR WHEEL |
| TIRE SLIP | FRONT WHEEL | LARGE | D | D | DD |
| | | SMALL | C | D | D |
| | NONE | | C | Z | D |
| | REAR WHEEL | SMALL | C | C | D |
| | | LARGE | CC | C | C |
| CORNERING | FORWARD | | C | Z | D |
| | RADIUS | LARGE | C | D | D |
| | | SMALL | D | D | DD |

C : COAST TORQUE    D : DRIVE TORQUE    Z : ZERO TORQUE

| DRIVING PATTERN | | | TIRE'S DYNAMIC RADIUS | | |
|---|---|---|---|---|---|
| CLASS | STATE | | FRONT WHEEL > REAR WHEEL | FRONT WHEEL = REAR WHEEL | FRONT WHEEL < REAR WHEEL |
| TIRE SLIP | FRONT WHEEL | LARGE | F>R | F>R | F≫R |
| | | SMALL | F<R | F>R | F>R |
| | NONE | | F<R | F≒R | F>R |
| | REAR WHEEL | SMALL | F<R | F<R | F<R |
| | | LARGE | F≪R | F<R | F≪R |
| CORNERING | FORWARD | | F<R | F≒R | F>R |
| | RADIUS | LARGE | F>R | F>R | F>R |
| | | SMALL | F>R | F>R | F≫R |

F : FRONT-WHEEL-SIDE ROTATION SPEED
R : REAR-WHEEL-SIDE ROTATION SPEED

FIG. 13B

| DRIVING PATTERN | | | TIRE'S DYNAMIC RADIUS | | |
|---|---|---|---|---|---|
| CLASS | STATE | | FRONT WHEEL > REAR WHEEL | FRONT WHEEL = REAR WHEEL | FRONT WHEEL < REAR WHEEL |
| TIRE SLIP | FRONT WHEEL | LARGE | D | D | DD |
| | | SMALL | C | D | D |
| | NONE | | C | Z | D |
| | REAR WHEEL | SMALL | C | C | D |
| | | LARGE | CC | C | C |
| CORNERING | FORWARD | | C | Z | D |
| | RADIUS | LARGE | C | D | D |
| | | SMALL | D | D | DD |

C : COAST TORQUE    D : DRIVE TORQUE    Z : ZERO TORQUE

| DRIVING PATTERN | | | TIRE'S DYNAMIC RADIUS | | |
|---|---|---|---|---|---|
| CLASS | STATE | | FRONT WHEEL > REAR WHEEL | FRONT WHEEL = REAR WHEEL | FRONT WHEEL < REAR WHEEL |
| TIRE SLIP | FRONT WHEEL | LARGE | F>R | F>R | F>R |
| | | SMALL | F<R | F>R | F>R |
| | NONE | | F<R | F≒R | F>R |
| | REAR WHEEL | SMALL | F<R | F<R | F>R |
| | | LARGE | F<R | F<R | F<R |
| CORNERING | FORWARD | | F<R | F≒R | F>R |
| | RADIUS | LARGE | F>R | F>R | F>R |
| | | SMALL | F>R | F>R | F>R |

F : FRONT-WHEEL-SIDE ROTATION SPEED
R : REAR-WHEEL-SIDE ROTATION SPEED

FIG. 15B

| DRIVING PATTERN | | | TIRE'S DYNAMIC RADIUS | | |
|---|---|---|---|---|---|
| CLASS | STATE | | FRONT WHEEL > REAR WHEEL | FRONT WHEEL = REAR WHEEL | FRONT WHEEL < REAR WHEEL |
| TIRE SLIP | FRONT WHEEL | LARGE | C | C | CC |
| | | SMALL | D | C | C |
| | NONE | | D | Z | C |
| | REAR WHEEL | SMALL | D | D | C |
| | | LARGE | DD | D | D |
| CORNERING | FORWARD | | D | Z | C |
| | RADIUS | LARGE | D | C | C |
| | | SMALL | C | C | CC |

608

C : COAST TORQUE   D : DRIVE TORQUE   Z : ZERO TORQUE

US 8,177,672 B2

DRIVING-FORCE TRANSMITTING APPARATUS FOR FOUR-WHEEL-DRIVE VEHICLE

This application is a priority based on prior application No. JP 2009-104752, filed Oct. 10, 2009 in Japan.

BACKGROUND OF THE INVENTION

1. Field of the Invention

The present invention relates to driving-force transmitting apparatuses for four-wheel-drive vehicles capable of switching between two-wheel drive and four-wheel drive and, in particular, a driving-force transmitting apparatus for a four-wheel-drive vehicle stopping the rotation of a portion not related to transmission of driving force in two-wheel drive.

2. Description of the Related Arts

In a conventional so-called on-demand-type full-time four-wheel-drive vehicle, as an example of a driving-force transmitting apparatus for an FF-vehicle-base four-wheel-drive vehicle that uses an electronic control coupling device to control distribution of a driving force in a manner such that front wheels are driven in a two-wheel-drive mode and rear wheels are driven in a four-wheel-drive mode, an apparatus shown in FIG. 1 is known.

In FIG. 1, a driving-force transmitting apparatus 610 is provided in a four-wheel-drive vehicle 612, and the speed of a driving force from an engine 628 is changed by a change gear 630 for input to a front-wheel differential device 614 from a drive gear 632 of the change gear 630 via a ring gear 634 and also transmission to an output pinion 664 via a bevel gear 662 integrally rotating with the ring gear 634 connected to the front-wheel differential device 614. A driving force from the output pinion 664 is transmitted to an electronic-control coupling device 624 having a multi-plate clutch mechanism 672 and an actuator 674 via a propeller shaft 668. In two-wheel drive, when the electronic-control coupling device 624 is cut off (in the state where the multi-plate clutch mechanism 672 is released), the driving force is not transmitted to a rear-wheel differential device 618 but is transmitted only to the front-wheel differential device 614. While absorbing a difference in rotation speed between a left-front wheel 650 and a right-front wheel 652, the front-wheel differential device 614 provides the same torque to the left-front wheel 650 and the right-front wheel 652 for rotation. In four-wheel drive, when the electronic-control coupling device 624 is connected in four-wheel drive (in the state where the multi-plate clutch mechanism 672 is connected), the driving force is transmitted also to the rear-wheel differential device 618 from a drive pinion 676 coupled to the electronic-control coupling device 624 via a ring gear 678. While absorbing a difference in rotation speed between a left-rear wheel 700 and a right-rear wheel 702, the rear-wheel differential device 618 provides the same torque to the left-rear wheel 700 and the right-rear wheel 702. The electronic-control coupling device 624 operates the actuator 674 with a control signal E6 from an ECU 626 to successively change a connection force of the multi-plate clutch mechanism 672, thereby allowing control of the torque to be transmitted via the rear-wheel differential device 618 to the left-rear wheel 700 and the right-rear wheel 702 between zero and a predetermined maximum torque. With this, in the two-wheel drive mode, the transmission torque of the electronic-control coupling device 624 is controlled at zero to cause the driving force to be transmitted only to the front-wheel differential device 614. In the four-wheel drive mode, the transmission torque of the electronic-control coupling device 624 is controlled at an appropriate torque according to the running state of the vehicle for transmission also to the rear-wheel differential device 618. Also, as an example of a driving-force transmitting apparatus for an FR-vehicle-base four-wheel-drive vehicle, the apparatus driving the rear wheels in the two-wheel drive mode and controlling distribution of the driving force to the front wheels with an electronic-control coupling device in the four-wheel drive mode, an apparatus shown in FIG. 2 is known.

In FIG. 2, a driving-force transmitting device 710 is provided in a four-wheel-drive vehicle 712, and the speed of a driving force from an engine 728 is changed by a change gear 730 for input to an electronic-control coupling device 724 having a multi-plate clutch mechanism 772 and an actuator 774. In two-wheel drive, when the electronic-control coupling device 724 is cut off (in the state where the multi-plate clutch mechanism 772 is released), the driving force is directly transmitted to a rear-wheel differential device 714 via a propeller shaft 762, a drive pinion 732, and a ring gear 734. While absorbing a difference in rotation speed between a left-rear wheel 750 and a right-rear wheel 752, the rear-wheel differential device 714 provides the same torque to the left-rear wheel 750 and the right-rear wheel 752 for rotation. In four-wheel drive, when the electronic-control coupling device 724 is connected in four-wheel drive (in the state where the multi-plate clutch mechanism 772 is connected), the driving force is transmitted also to a front-wheel differential device 718 from a chain belt mechanism 764 coupled to the multi-plate clutch mechanism 772 via a propeller shaft 768, a drive pinion 776, and a ring gear 778 on a front-wheel side. While absorbing a difference in rotation speed between a left-front wheel 800 and a right-front wheel 802, the front-wheel differential device 718 provides the same torque to the left-front wheel 800 and the right-front wheel 802. The electronic-control coupling device 724 operates the actuator 774 with a control signal E7 from an ECU 726 to successively change a connection force of the multi-plate clutch mechanism 772, thereby allowing control of the torque to be transmitted via the front-wheel differential device 718 to the left-front wheel 800 and the right-front wheel 802 between zero and a predetermined maximum torque.

With this, in the two-wheel drive mode, the transmission torque of the electronic-control coupling device 724 is controlled at zero to cause the driving force to be transmitted only to the rear-wheel differential device 714. In the four-wheel drive mode, the transmission torque of the electronic-control coupling device 724 is controlled at an appropriate torque according to the running state of the vehicle for transmission also to the front-wheel differential device 718.

However, in the conventional driving-force transmitting apparatus 610 as depicted in FIG. 1, even in the two-wheel drive mode, the driving force from the change gear 630 rotates a driving side (front-wheel side) of a bevel gear 662, the output pinion 664, the propeller shaft 668, and the multi-plate clutch mechanism 672. Also, with the left-rear wheel 700 and the right rear wheel 702 and the rear-wheel differential device 618 being directly connected, the left-rear wheel 700 and the right-rear wheel 702 rotate with the driving force from the road surface, thereby causing a driven side (rear-wheel side) of the ring gear 678, the drive pinion 676, and the multi-plate clutch mechanism 672 to rotate. That is, in the two-wheel drive mode in which the electronic-control coupling device 624 is cut off and the driving force is not transmitted to the rear wheels, even if the multi-plate clutch mechanism 672 is completely released, each component of a driving-force transmitting unit 616 including the bevel gear 662, the output pinion 664, the propeller shaft 668, the multi-plate clutch mechanism 672, the drive pinion 676, and the ring gear 678 rotate via the rear-wheel differential device 618. Moreover, in the conventional driving-force transmitting device 710 as depicted in FIG. 2, even in the two-wheel drive mode in which the multi-plate clutch mechanism 772 is released and the driving force is not transmitted to the front wheels, since the left-front wheel 800 and the right-front wheel 802 and the front-wheel differential device 718 are directly connected, the left-front wheel 800 and the right-front wheel 802 rotate with the driving force from the road surface, thereby causing each component of the driving-force transmitting unit 716 including the ring gear 778, the drive pinion 776, the propeller shaft 668 on a front-wheel side, and the chain belt mechanism 764 to rotate via the front-wheel differential device 718. In this manner, in the FF-vehicle-base four-wheel-drive vehicle 612 depicted in FIG. 1, although two-wheel drive can be achieved, in terms of driving force, by setting the transmission torque of the electronic-control coupling device 624 at zero, the driving-force transmitting unit 616 always rotates as transmitting the driving force from the engine to the front-wheel-differential device 614 and to the rear wheels. Furthermore, also in the FR-vehicle-base four-wheel-drive vehicle 712 depicted in FIG. 2, as with the case of the FF-vehicle base of FIG. 1, although two-wheel drive can be achieved, in terms of driving force, by setting the transmission torque of the electronic-control coupling device 724 at zero, the driving-force transmitting unit 716 always rotates as transmitting the driving force from the engine to the electronic-control coupling device 724 to front wheels. For this reason, in these conventional four-wheel-drive vehicles 612 and 712, fuel efficiency is disadvantageously deteriorated even in the two-wheel drive mode, compared with that of a two-wheel-drive vehicle, due to agitation resistance of oil, friction loss of a bearing portion, and other factors in the driving-force transmitting units 616 and 716.

SUMMARY OF THE INVENTION

According to the present invention, a driving-force transmitting apparatus for a four-wheel-drive vehicle is provided for achieving a reduction in fuel efficiency in two-wheel drive by completely stopping the rotation of a driving-force transmitting unit for rear wheels or front wheels not associated with transmission of the driving force.

The present invention is directed to a driving-force transmitting apparatus for a four-wheel-drive vehicle capable of switching between a four-wheel drive mode of transmitting a driving force to front wheels and rear wheels and a two-wheel drive mode of transmitting the driving force only to the front wheels, and the apparatus includes:

a front-wheel differential device that distributes and outputs a driving force input from an engine to left-front and right-front wheels;

a driving-force transmitting unit that transmits the driving force from the engine via the front-wheel differential device to the rear wheels; a rear-wheel differential device that distributes and outputs the driving force input from the driving-force transmitting unit to left-rear and right-rear wheels;

a first disengaging mechanism that cuts off and connects a joint between the front-wheel differential device and the driving-force transmitting unit;

a second disengaging mechanism that cuts off and connects a joint between the rear-wheel differential device and at least one of the left-rear and right-rear wheels and has a synchronizing mechanism that synchronizes a rotation of a driving-force transmitting unit side and a rotation of an opposing side at the time of connection; and a control unit that connects the first disengaging mechanism and the second disengaging mechanism to transmit the driving force from the engine to the left-rear and right-rear wheels in the four-wheel drive mode, and cuts off the first disengaging mechanism and the second disengaging mechanism to stop a rotation of the driving-force transmitting unit in the two-wheel drive mode, wherein the driving-force transmitting unit configures a change gear ratio between the front and rear wheels so that the driving-force transmitting unit side of the first disengaging mechanism rotates at a speed higher than that of the opposing side with the first disengaging mechanism being cut off at the time of completion of synchronization of the second disengaging mechanism, and in switching from the two-wheel drive mode to the four-wheel drive mode, the control unit first starts synchronization of the second disengaging mechanism to increase a rotation speed of the driving-force transmitting unit, and next connects the first disengaging mechanism when a difference in rotation speed between the driving-force transmitting unit side of the first disengaging mechanism and the opposing side is decreased to a predetermined range.

As another structure of the driving-force transmitting apparatus for an FF-vehicle-base four-wheel-drive vehicle according to the present invention, the present invention is directed to a driving-force transmitting apparatus for a four-wheel-drive vehicle capable of switching between a four-wheel drive mode of transmitting a driving force to front wheels and rear wheels and a two-wheel drive mode of transmitting the driving force only to the front wheels, and the apparatus includes:

a front-wheel differential device that distributes and outputs a driving force input from an engine to left-front and right-front wheels;

a driving-force transmitting unit that transmits the driving force from the engine via the front-wheel differential device to the rear wheels;

a rear-wheel differential device that distributes and outputs the driving force input from the driving-force transmitting unit to left-rear and right-rear wheels;

a second disengaging mechanism that cuts off and connects a joint between the front-wheel differential device and the driving-force transmitting unit and synchronizes a rotation of a driving-force transmitting unit side and a rotation of an opposing side at the time of connection;

a first disengaging mechanism that cuts off and connects a joint between the rear-wheel differential device and at least one of the left-rear and right-rear wheels; and a control unit that connects the first disengaging mechanism and the second disengaging mechanism to transmit the driving force from the engine to the left-rear and right-rear wheels in the four-wheel drive mode, and cuts off the first disengaging mechanism and the second disengaging mechanism to stop a rotation of the driving-force transmitting unit in the two-wheel drive mode, wherein the driving-force transmitting unit configures a change gear ratio between the front and rear wheels so that the driving-force transmitting unit side of the first disengaging mechanism rotates at a speed higher than that of the opposing side with the first disengaging mechanism being cut off at the time of completion of synchronization of the second disengaging mechanism and, in switching from the two-wheel drive mode to the four-wheel drive mode, the control unit first starts synchronization of the second disengaging mechanism to increase a rotation speed of the driving-force transmitting unit, and next connects the first disengaging mechanism when a difference in rotation speed between the driving-force transmitting unit side of the first disengaging mechanism and the opposing side is decreased to a predetermined range.

Also, a driving-force transmitting apparatus for an FR-vehicle-base four-wheel-drive vehicle according to the present invention is configured as follows. The present invention is directed to a driving-force transmitting apparatus for a four-wheel-drive vehicle capable of switching between a four-wheel drive mode of transmitting a driving force to front wheels and rear wheels and a two-wheel drive mode of transmitting the driving force only to the rear wheels, and the apparatus includes:

a rear-wheel differential device that distributes and outputs a driving force input from an engine to left-rear and right-rear wheels;

a second disengaging mechanism that receives the driving force input from the engine and successively changes an output to the front wheels between cut-off and connection;

a driving-force transmitting unit that transmits a driving force from the second disengaging mechanism to the front wheels; a differential device that receives the driving force input from the driving-force transmitting unit for distribution and output to left-front and right-front wheels;

a first disengaging mechanism that cuts and connects a joint between the front-wheel differential device and at least one of the left-front wheel and the right-front wheel; and a control unit that connects the first disengaging mechanism and the second disengaging mechanism to transmit the driving force from the engine to the left-front and right-front wheels in the four-wheel drive mode, and cuts off the first disengaging mechanism and the second disengaging mechanism to stop a rotation of the driving-force transmitting unit in the two-wheel drive mode, wherein the driving-force transmitting unit configures a change gear ratio between the front and rear wheels so that a driving-force transmitting unit side of the first disengaging mechanism rotates at a speed higher than that of an opposing side with the first disengaging mechanism being cut off at the time of completion of connection of the second disengaging mechanism and, in switching from the two-wheel drive mode to the four-wheel drive mode, the control unit first starts connection of the second disengaging mechanism to increase a rotation speed of the driving-force transmitting unit, and next connects the first disengaging mechanism when a difference in rotation speed between the driving-force transmitting unit side of the first disengaging mechanism and the opposing side is decreased to a predetermined range.

In the driving-force transmitting apparatus for FF-vehicle-base and FR-vehicle-base four-wheel-drive vehicles, with the first disengaging mechanism being cut off, at the time of completion of connection of the second disengaging mechanism, a difference in dynamic radius between the front and rear wheels is cancelled out, and a change gear ratio between the front and rear wheels is further configured so that the driving-force transmitting unit side of the first disengaging mechanism rotates at a speed higher than that of the opposing side.

Also, the first disengaging mechanism is an engaging clutch mechanism that switches between release and coupling with an operation of a first actuator, the second disengaging mechanism is a multi-plate clutch mechanism that successively changes a transmission torque between release and coupling with an operation of a second actuator, or an engaging clutch mechanism that has a synchronizing mechanism of a friction clutch scheme and switches between release and coupling with an operation of the second actuator, and the control unit controls the first and second disengaging mechanisms by operating the first and second actuators.

Furthermore, the control unit first operates, in switching from the two-wheel drive mode to the four-wheel drive mode, the second actuator to match a rotation speed of the driving-force transmitting unit side of the first disengaging mechanism with a rotation speed of the opposing side, and then, with the rotation speeds being matched each other, operates the first actuator to connect the first disengaging mechanism.

Alternatively, the driving-force transmitting unit includes a coupling that successively changes the transmission torque by operating a third actuator, and in switching from the two-wheel drive mode to the four-wheel drive mode, the control unit first operates the second actuator to connect the second disengaging mechanism, next operates a third actuator to match a rotation speed of the driving-force transmitting unit of the first disengaging mechanism with a rotation speed of the opposing side, and next operates, with the rotation speeds being matched, the first actuator to connect the first disengaging mechanism.

Furthermore, the first disengaging mechanism includes a shift rod that moves, in a reciprocating manner, between a released position and a coupled position of the engaging clutch mechanism with an operation of the first actuator, a shift fork slidably fitting in the shift rod, restrained with respect to a movement in a coupling direction of the shift rod, and free with respect to a movement in a direction of releasing the shift rod, a spring that always presses the shift fork in a direction of releasing of the engaging clutch mechanism, and a coupling sleeve engaging with the shift fork to move, in a reciprocating manner, between the released position and the coupled position of the engaging clutch mechanism, with a movement of the shift rod to the coupled position, the shift fork is integrally moved against a pressing force of the spring to cause the coupling sleeve to couple the engaging clutch mechanism, and, with a movement of the shift rod to the released position, the shift fork is set free and the coupling sleeve is pressed in the released direction with the spring and, when a torque acting on the coupling sleeve is decreased and a force of restraining the coupling sleeve becomes below a pressing force of the spring in a releasing direction, the coupling sleeve moves to the released position to release the engaging clutch.

Still further, in switching from the four-wheel drive mode to the two-wheel drive mode, the control unit first acts a torque from the driving-force transmitting unit on the first actuator, then operates the first actuator to move the shift rod to the released position, and next operates the second actuator to start cutting off the second disengaging mechanism, and the first disengaging mechanism has the engaging clutch released when a direction of the torque acting on the coupling sleeve is transformed.

According to the present invention, in the two-wheel drive mode, with the first disengaging mechanism and the second disengaging mechanism being cut off, the rotation of the components of the driving-force transmitting unit becomes in a completely-stop state, no oil viscous drag or friction loss occurs in this section. Therefore, a decrease in fuel efficiency can be prevented, and fuel efficiency for use in the two-wheel drive mode despite a four-wheel-drive vehicle can be at the same level of fuel efficiency of a two-wheel-drive vehicle.

Also, as for the driving-force transmitting unit, by configuring the change gear ratio between the front and rear wheels so that a driving-force transmitting unit side of the first disengaging mechanism rotates at a speed higher than that of an opposing side at the time of completion of synchronization of the second disengaging mechanism, in switching from the two-wheel drive mode to the four-wheel drive mode, a state infallibly occurs in which the difference in rotation speed between both sides of the first disengaging mechanism becomes zero, thereby preventing a non-connectable state due to the difference in rotation speed of the first disengaging mechanism. In switching from the four-wheel drive mode to the two-wheel drive mode, since a state infallibly occurs in which the transmission torque of the first disengaging mechanism becomes zero, a cut-off operation of the first disengaging mechanism can be performed smoothly with a small force, thereby downsizing and simplifying the structure of the first disengaging mechanism to reduce cost.

Furthermore, by controlling the difference in rotation speed between both sides of the first disengaging mechanism by a synchronizing mechanism of the second disengaging mechanism, the first disengaging mechanism can be quickly and reliably connected, thereby allowing quick switching from the two-wheel drive mode to the four-wheel drive mode irrespectively of the running state. The above and other objects, features, and advantages of the present invention will become more apparent from the following detailed description with reference to the drawings.

BRIEF DESCRIPTION OF THE DRAWINGS

FIGS. 7A and 7B are illustrative diagrams depicting connection control of the first disengaging mechanism of FIG. 3;

FIGS. 10A and 10B are illustrative diagrams depicting disconnectable conditions of the first disengaging mechanisms of FIG. 3 and FIG. 8;

FIGS. 13A and 13B are illustrative diagrams depicting disengageable conditions of a first disengaging mechanism of FIG. 12;

FIGS. 15A and 15B are illustrative diagrams depicting disengageable conditions of a first disengaging mechanism of FIG. 14.

DETAILED DESCRIPTION OF THE PREFERRED EMBODIMENT

The driving-force transmitting apparatus for a four-wheel-drive vehicle of the present invention is described in detail below based on the drawings that depict embodiments. Each embodiment depicts an FF (Front-engine Front-drive)-vehicle-base four-wheel-drive vehicle that drives front wheels in two-wheel drive or a FR (Front-engine Rear-drive)-vehicle-base four-wheel-drive vehicle that drives rear wheels in two-wheel drive. Also, in the four-wheel-drive vehicle of each embodiment, at least an engine and a driving-force transmitting apparatus are controlled by an ECU (Electronic Control Unit) based on detection value of various vehicle-state detection sensors.

Figure 3:
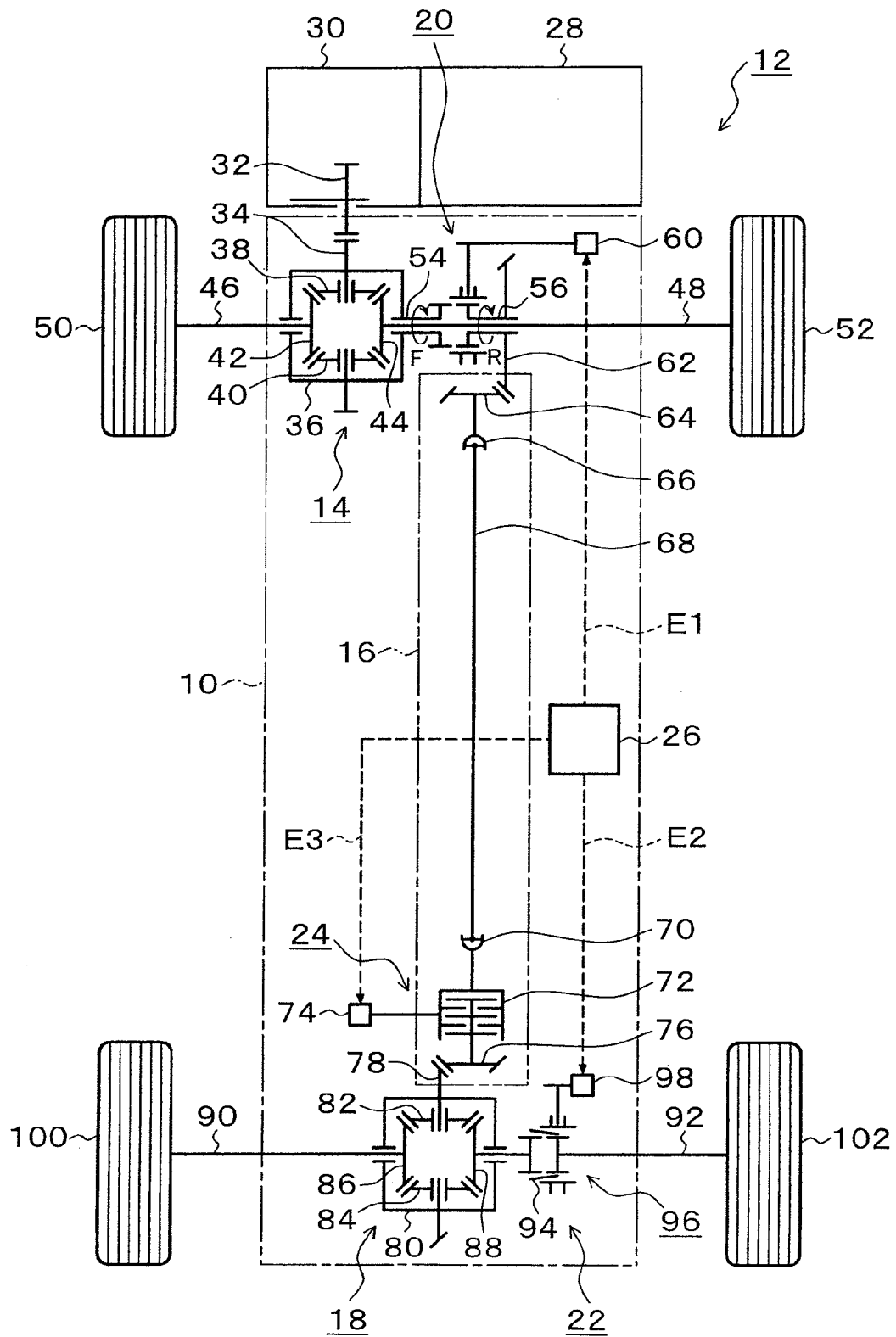
FIG. 3 is an illustrative diagram depicting a first embodiment of a driving-force transmitting apparatus for a four-wheel-drive vehicle according to the present invention.

FIG. 3 is an illustrative diagram depicting a first embodiment of a driving-force transmitting apparatus for a four-wheel-drive vehicle according to the present invention, where the apparatus is applied to an FF-vehicle-base four-wheel-drive vehicle. In FIG. 3, a driving-force transmitting apparatus 10 of the present embodiment is provided to a four-wheel-drive vehicle 12, and includes a front-wheel differential device 14, a driving-force transmitting unit 16, and a rear-wheel differential device 18. Also, a first disengaging mechanism 20 is provided between the front-wheel differential device 14 and the driving-force transmitting unit 16, and a second disengaging mechanism 22 is provided between the rear-wheel differential device 18 and a right-rear wheel 102. Furthermore, the driving-force transmitting unit 16 includes an electronic-control coupling device 24. To the first disengaging mechanism 20, the second disengaging mechanism 22, and the electronic-control coupling device 24 of the driving-force transmitting apparatus 10, control signals E1, E2, and E3 are given from an ECU 26.

After the speed of a driving force from an engine 28 is changed by a change gear 30, the driving force is input from a drive gear 32 of the change gear 30 to the front-wheel differential device 14. The front-wheel differential device 14 transmits the driving force from the change gear 30 to a left-front wheel 50 and a right-front wheel 52. The front-wheel differential device 14 is configured of a ring gear 34 engaging with the drive gear 32, a differential case 36 having the ring gear 34 fixed thereto, pinions 38 and 40 rotatably and axially supported inside of the differential case 36, and side gears 42 and 44 engaging with the pinions 38 and 40. A driving force from the drive gear 32 is received by the ring gear 34 to drive a left-front-wheel driving shaft 46 and a right-front-wheel driving shaft 48 via the pinions 38 and 40 and the side gears 42 and 44 and rotate the left-front wheel 50 and the right-front wheel 52. With this, the driving force is transmitted onto a road surface. When a difference in rotation speed occurs between the left-front wheel 50 and the right-front wheel 52 at the time of cornering or due to a change of a road surface state or the like, the front-wheel differential device 14 absorbs the rotation speed to provide the same torque to the left-front wheel 50 and the right-front wheel 52 for rotation. The driving force from the drive gear 32 is input also to the first disengaging mechanism 20 via the ring gear 34 and the differential case 36 of the front-wheel differential device 14. In the two-wheel drive mode, the first disengaging mechanism 20 is in a state of disengaging the driving-force transmitting unit 16 by an operation with the control signal E1 from the ECU 26 and cutting off the driving force to a rear-wheel side. Therefore, in the case of the two-wheel drive mode, the driving force from the engine 28 is not transmitted to a rear-wheel side via the driving-force transmitting unit 16. On the other hand, in the case of the four-wheel drive mode, the first disengaging mechanism 20 is in a contact state with the driving-force transmitting unit 16 by an operation with the control signal E1 from the ECU 26. Therefore, the driving force input to a differential case shaft 54 integrally formed on the differential case 36 is transmitted to a bevel gear shaft 56, and the transmitting direction is converted by a bevel gear 62 and an output pinion 64 fixed to the bevel gear shaft 56 for output. The driving force output from the output pinion 64 is transmitted via a universal joint 66, a propeller shaft 68 and a universal joint 70, and the electronic-control coupling device 24 to a drive pinion 76, and the direction is converted and transmitted from the drive pinion 76 to a ring gear 78 of the rear-wheel differential device 18. In the present embodiment, a multi-plate clutch mechanism 72 is used as the electronic-control coupling device 24. In the two-wheel drive mode, the multi-plate clutch mechanism 72 operates an actuator 74 with the control signal E3 from the ECU 26, and is controlled to be in a released state in which no driving force is transmitted. In the four-wheel drive mode, the multi-plate clutch mechanism 72 operates the actuator 74 with the control signal E3 from the ECU 26 according to a signal from a vehicle-state detection sensor (not shown), and is optimally controlled between a released state in which no driving force is transmitted (two-wheel drive state) and a directly-connected state in which a maximum driving force is transmitted, thereby transmitting the driving force from the engine 28 via the rear-wheel differential device 18 to a left-rear wheel 100 and the right-rear wheel 102. The rear-wheel differential device 18 is configured of the ring gear 78 engaging with the drive pinion 76, a differential case 80 having a ring gear 78 fixed thereto, pinions 82 and 84 rotatably and axially supported inside of the differential case 80, and side gears 86 and 88 engaging with the pinions 82 and 84. Via a left-rear-wheel driving shaft 90 jointed to the side gear 86 and the second disengaging mechanism 22 and a right-rear-wheel driving shaft 92 jointed to the side gear 88, a left-rear wheel 100 and the right-rear wheel 102 are rotated to cause the driving force to be transmitted onto the road surface. The second disengaging mechanism 22 is provided at some point of the right-rear-wheel driving shaft 92 jointing the rear-wheel differential device 18 and the right-rear wheel 102 to disengage the driving force to the right-rear wheel 102. In the two-wheel drive mode, the second disengaging mechanism 22 operates the actuator 98 with the control signal E2 from the ECU 26 to be controlled in a cut-off state, disengaging transmission of the driving force between the right-rear wheel 102 and the rear-wheel differential device 18. In the four-wheel drive mode, the second disengaging mechanism 22 operates the actuator 98 with the control signal E2 from the ECU 26 to be controlled in a connected state, thereby transmitting the driving force from the engine 28 via the electronic-control coupling device 24 and the rear-wheel differential device 18 to the right-rear wheel 102. That is, in the four-wheel drive mode, the rear-wheel differential device 18 effectively operates. Even when a difference in rotation speed occurs between the left-rear wheel 100 and the right-rear wheel 102 at the time of cornering or due to a change of a road surface state or the like, the rear-wheel differential device 18 can absorb the difference in rotation speed to provide the same torque to the left-rear wheel 100 and the right-rear wheel 102 for rotation.

Figure 4:
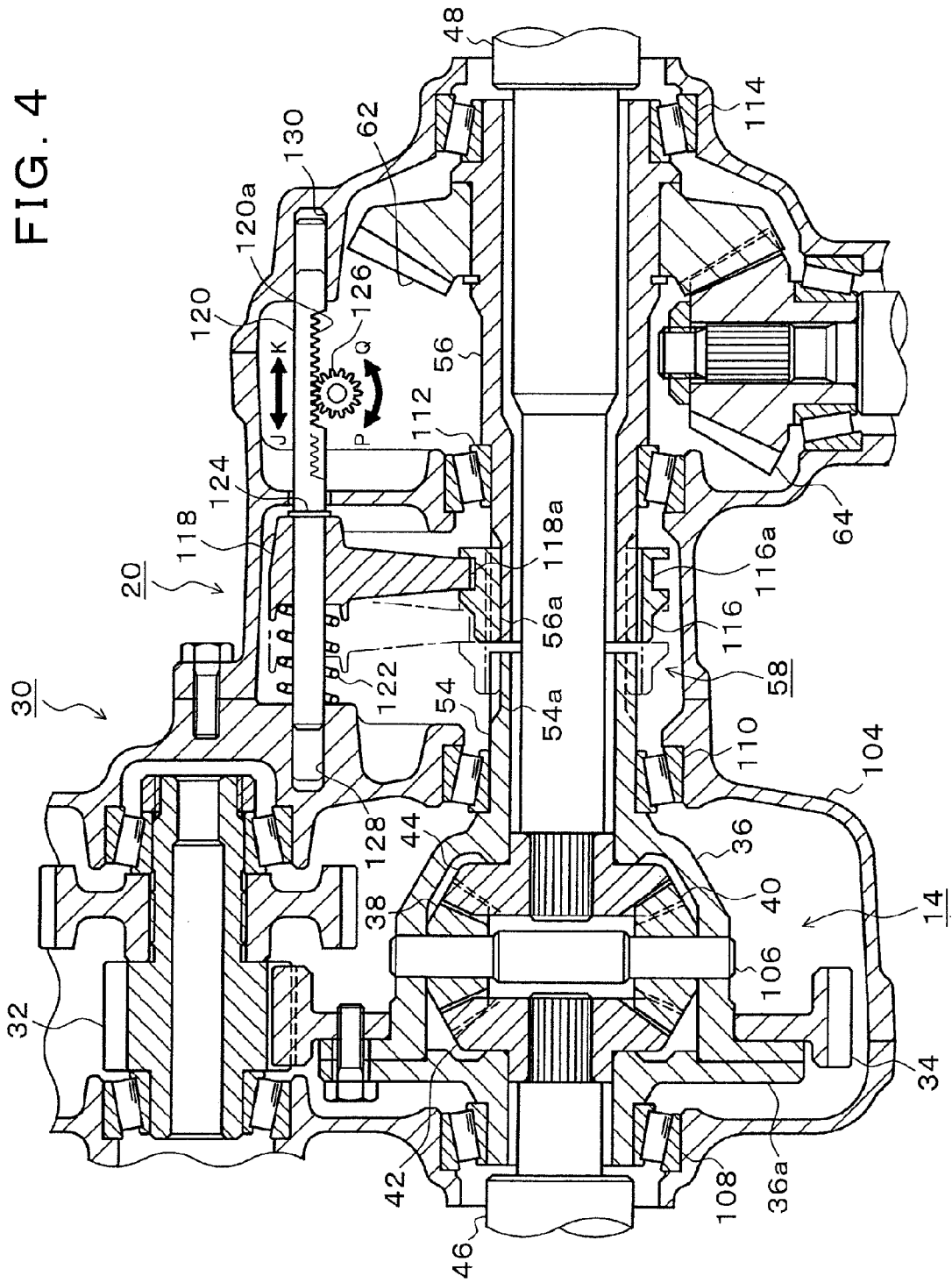
FIG. 4 is a section view depicting an embodiment of a front-wheel differential device and a first disengaging mechanism of FIG. 3.

FIG. 4 is a section view depicting the front-wheel differential device 14 and the first disengaging mechanism 20 of FIG. 3, and an upper portion of the drawing represents a front side (forward direction) of a four-wheel-drive vehicle 12. In the present embodiment, an engaging clutch mechanism 58 is used as the first disengaging mechanism 20. With a shift operation by the actuator 60, switching is made between a cut-off state as a two-wheel drive mode and a connected state as a four-wheel drive mode. In FIG. 4, the front-wheel differential device 14, the first disengaging mechanism 20, the bevel gear 62, and the output pinion 64 are accommodated in a housing 104 connected to the change gear 30. The front-wheel differential device 14 positioned on a left side of the housing 104 includes the ring gear 34 fixed to a flange portion 36a of the differential case 36, the pinions 38 and 40 rotatably and axially supported to a pinion shaft 106 fixed to the differential case 36, the side gear 42 rotatably supported to the differential case 36 and non-rotatably coupling the left-front-wheel driving shaft 46, and a side gear 44 rotatably supported to the differential case 36 and non-rotatably coupling the right-front-wheel driving shaft 48. The ring gear 34 engages with the drive gear 32 of the change gear 30, and the side gears 42 and 44 engage the pinions 38 and 40, respectively. The differential case 36 has its left-front-wheel driving shaft 46 side and right-front-wheel driving shaft 48 side both rotatably supported to the housing 104 by taper roller bearings 108 and 110, respectively. On a right side of the housing 104, the bevel gear shaft 56 is provided that makes the bevel gear 62 non-rotatably fit in coaxially with the differential case 36. The bevel gear shaft 56 has its differential case 36 side and bevel gear 62 side both rotatably supported by taper roller bearings 112 and 114, respectively, to the housing 104. On a lower-right side of the housing 104, an output pinion 64 engaging with the bevel gear 62 is disposed. The output pinion 64 is jointed to the propeller shaft 68 via the universal joint 66 connected below. Also, the first disengaging mechanism 20 is provided midway between the front-wheel differential device 14 and the bevel gear 62. The first disengaging mechanism 20 is configured of an engaging clutch mechanism 58, which is configured of a groove portion 54a formed on an outer perimeter of a right end of the differential case shaft 54, a groove portion 56a formed on an outer perimeter of a left end of the bevel gear shaft 56, and a coupling sleeve 116; a shift fork 118 operating the engaging clutch mechanism 58; a shift rod 120; springs 122; a pinion 126, and a servo motor (not shown). The coupling sleeve 116 makes spline coupling with the grooves 54a and 56a to be able to move between a coupled position of jointing the differential case shaft 54 and the bevel gear shaft 56 and a released position of setting free the joint. With a tip portion 118a slidably engaging with a groove portion 116a of the coupling sleeve 116, the shift fork 118 can cause the coupling sleeve 116 to slide. The shift fork 118 slidably fits in the shift rod 120, and is pressed in a releasing direction of the coupling sleeve 116 by the springs 122 and is regulated by a snap ring 124 at a predetermined position. The shift rod 120 forms a rack 120a with which the pinion 126 driven by the servo motor (the actuator 60 of FIG. 1) engages, and has both ends slidably incorporated in shaft holes 128 and 130 provided in the housing 104. The state in which the first disengaging mechanism 20 is cut off in two-wheel drive is depicted. The coupling sleeve 116 does not engage with a spline groove 54a of the differential case shaft 54, and is at a released position where the differential case shaft 54 and the bevel gear shaft 56 are not jointed. In four-wheel drive, the coupling sleeve 116 joints the differential case shaft 54 and the bevel gear shaft 56 (depicted with phantom lines), thereby causing the first disengaging mechanism 20 to be in a connected state. In this state, the driving force from the drive gear 32 engaging with the ring gear 34 can be transmitted to the propeller shaft 68 via the bevel gear 62 and the output pinion 64.

Also, in the present embodiment, as will be described in detail next with reference to FIG. 5, an engaging clutch mechanism 96 having a synchronizing mechanism 94 is used as the second disengaging mechanism 22 of FIG. 3. With an operation by the actuator 98, the engaging clutch mechanism 96 becomes in a released state in the two-wheel drive mode, and the engaging clutch mechanism 96 becomes in a coupled state in the four-wheel drive mode.

Figure 5:
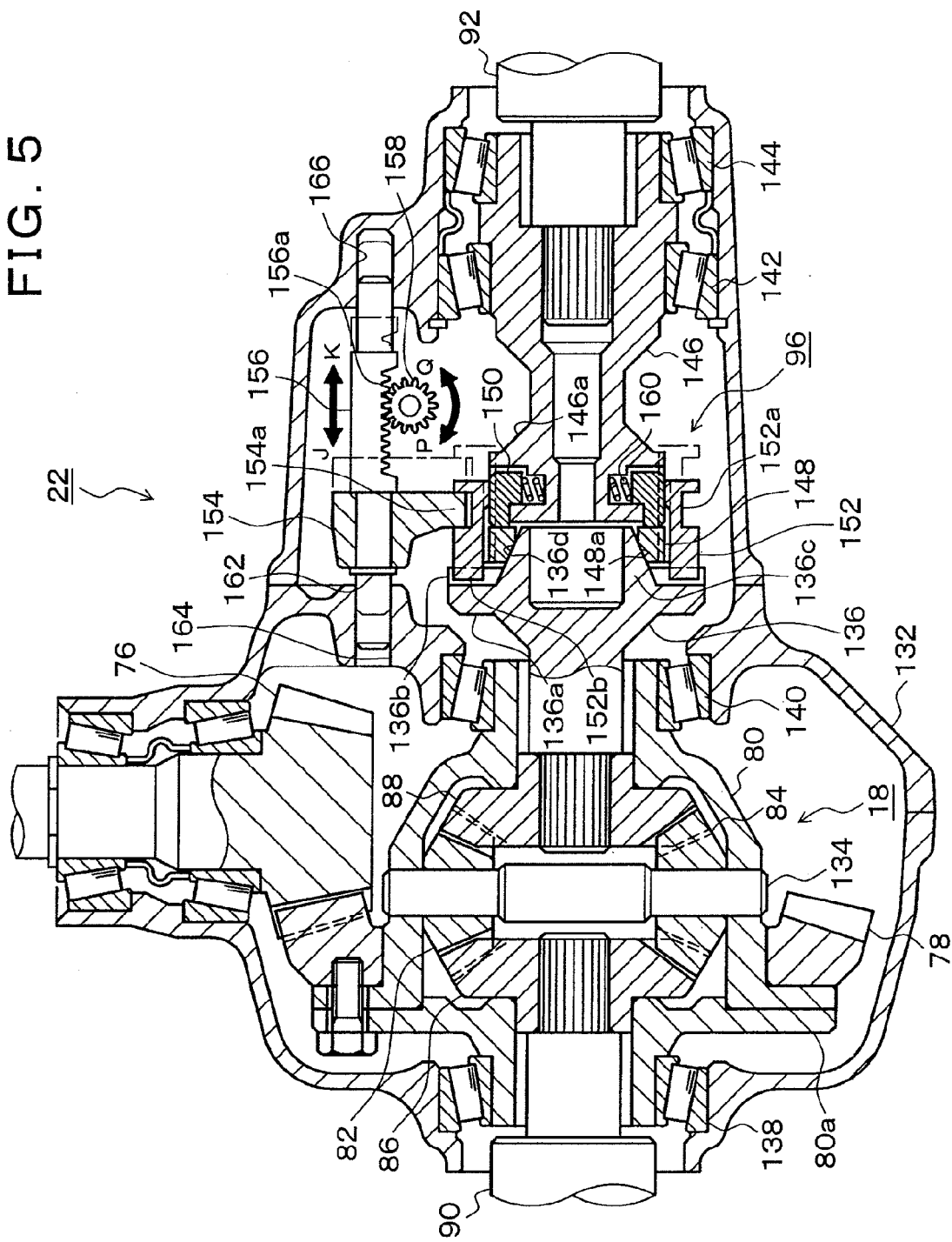
FIG. 5 is a section view depicting an embodiment of a rear-wheel differential device and a second disengaging mechanism of FIG. 3.

FIG. 5 is a section view depicting the rear-wheel differential device 18 and the second disengaging mechanism 22 of FIG. 3, and an upper portion of the drawing represents a front side (forward direction) of the four-wheel-drive vehicle 12. In FIG. 5, the drive pinion 76, the rear-wheel differential device 18, and the second disengaging mechanism 22 are accommodated in a housing 132. The rear-wheel differential device 18 positioned on a left side of the housing 132 includes the ring gear 78 fixed to a flange portion 80a of the differential case 80, pinions 82 and 84 rotatably and axially supported to a pinion shaft 134 fixed to the differential case 80, a side gear 86 non-rotatably jointing the left-rear-wheel driving shaft 90 rotatably and axially supported to the differential case 80, and the side gear 88 non-rotatably jointing a side gear shaft 136 rotatably and axially supported to the differential case 80. The ring gear 78 engages with the drive pinion 76 jointed to the electronic-control coupling device 24, and the side gears 86 and 88 engage with the pinions 82 and 84, respectively. The differential case 80 has its left-rear-wheel driving shaft 90 side and side gear shaft 136 side both rotatably supported to the housing 132 by taper roller bearings 138 and 140, respectively. On a right side of the housing 132, the second disengaging mechanism 22 is provided. The second disengaging mechanism 22 is configured of a nail portion 136b formed on a flange portion 136a on a right side of a side gear shaft 136, a synchro-cone 136c formed on an end face portion on the right side, a hub portion 146a formed on a left end of a clutch shaft 146, a balk ring 148, insert keys 150, a clutch sleeve 152, a shift fork 154, a shift rod 156, a pinion 158, and a servo motor (not shown). The synchro-cone 136c configures a cone friction clutch mechanism together with a friction surface 136d of an outer-perimeter portion and a friction surface 148a on an inner left side of the balk ring 148.

The clutch shaft 146 is rotatably supported to the housing 132 by taper roller bearings 142 and 144, with the right-rear-wheel driving shaft 92 non-rotatably jointed to a right side. The hub portion 146a is pressed by springs 160 in an outer-side diameter direction, and also has accommodated in an outer perimeter portion a plurality of insert keys 150 movable in an axial direction of the clutch shaft 146 to rotate together with the right-rear-wheel driving shaft 92. The clutch sleeve 152 makes spline coupling with an outer perimeter portion of the hub 146a to rotate together with the clutch shaft 146, and is movable, with a nail portion 152b engaging with the nail portion 136b of the side gear shaft 136, between a coupled position where the side gear shaft 136 and the right-rear-wheel driving shaft 92 are jointed and a released position where the engagement is dislodged to set free the joint. With a tip portion 154a slidably engaging with a groove portion 152a of the clutch sleeve 152, the shift fork 154 can cause the clutch sleeve 152 to slide. The balk ring 148 makes spline coupling with an inner perimeter portion of the clutch sleeve 152 to rotate together with the clutch sleeve 152, is movable between a synchronized position where a friction surface 148a is pressed onto a friction surface 136d of the synchro-cone 136c and a non-synchronized position where it is not pressed thereonto, and is pressed by the insert keys 150 tied to the sliding of the clutch sleeve 152 to cause a friction torque between the friction surface 148a and the friction surface 136d. The shift fork 154 is fixed by a snap ring 162 to the shift rod 156. The shift rod 156 forms a rack 156a with which the pinion 158 driven by the servo motor (the actuator 98 of FIG. 1) engages, and has both ends slidably incorporated in shaft holes 164 and 166 provided in the housing 132.

In FIG. 5, the state in which the second disengaging mechanism 22 is connected in four-wheel drive is depicted. The clutch sleeve 152 is in a coupled state where a nail portion 152b and the nail portion 136b of the side gear shaft 136 engage with each other, and is at a position where the side gear shaft 136 and the right-rear-wheel driving shaft 92 are jointed. In this state, the driving force from the drive pinion 76 engaging with the ring gear 78 can be transmitted to the right-rear wheel 102 via the right-rear-wheel driving shaft 92. In two-wheel drive, the shift fork 154 and the shift rod 156 move rightward to dislodge the engagement between the nail portion 152b and the nail portion 136b (depicted with phantom lines).

The clutch sleeve 152 and the side gear shaft 136 are thus not jointed, and the second disengaging mechanism 22 becomes in a cut-off state. In the present embodiment, although the engaging clutch mechanism 58 of the first disengaging mechanism 20 depicted in FIG. 4 uses a spline clutch scheme and the engaging clutch mechanism 96 of the second disengaging mechanism 22 uses a dog clutch scheme, both of the first disengaging mechanism 20 and the second disengaging mechanism 22 can use either of the clutch schemes, and may use a scheme other than these. Also, although the synchronizing mechanism of the second disengaging mechanism 22 uses a corn friction clutch scheme, it may use a scheme other than these. In the present embodiment, the shift rod 120 depicted in FIG. 4 and the shift rod 156 depicted in FIG. 5 are driven with the rotation of the pinions 126 and 158 engaging with the racks 120a and 156a, respectively. The actuator driving the shift rods 120 and 156 can be of any scheme of air-pressure, oil pressure, and electromagnetism, and can be a scheme other than that of the servo motor in the present embodiment. Here, the functions of the driving-force transmitting apparatus 10 in the two-wheel drive mode and the four-wheel drive mode of the first embodiment are described with reference to FIG. 3. In the two-wheel drive mode, with the control signal E1 of the ECU 26, the first disengaging mechanism 20 is cut off.

Therefore, although the driving force from the change gear 30 is transmitted to the differential case shaft 54 via the ring gear 34 and the differential case shaft 36 of the front-wheel differential device 14, since the first disengaging mechanism 20 is in a cut-off state, the driving force is not output to the bevel gear shaft 56. On the other hand, since the second disengaging mechanism 22 is also cut off with the control signal E2 from the ECU 26, even if the left-rear wheel 100 and the right-rear wheel 102 rotate, the ring gear 78 of the rear-wheel differential device 18 does not rotate. With this, the problem can be solved in which, in the two-wheel drive mode, the rotation of the driving-force transmitting unit 16 including the bevel gear 62, the output pinion 64, the universal joint 66, the propeller shaft 68, the universal joint 70, the electronic-control coupling device 24, the drive pinion 76, and the ring gear 78 of the rear-wheel differential device 18 is stopped to decrease fuel efficiency due to friction loss caused by the rotation of the driving-force transmitting unit 16 in two-wheel drive. For description in further detail, if the first disengaging mechanism 20 is not provided and the differential case 36 and the bevel gear 62 are jointed in the two-wheel drive mode, the driving force input to the ring gear 34 rotate the bevel gear 62, the output pinion 64, the universal joint 66, the propeller shaft 68, the universal joint 70, and a front-wheel side of the multi-plate clutch mechanism 72. Also, if the second disengaging mechanism 26 is not provided and the side gear 88 and the right-rear-wheel driving shaft 92 are jointed in the two-wheel drive mode, for example, when the side gears 86 and 88 rotate in the same direction at the same speed, the pinions 82 and 84 do not rotate (rotate by themselves), but the differential case 80 axially supporting the pinions 82 and 84 and the ring gear 78 rotate.

Even if there is a difference in rotation speed between the side gears 86 and 88, the differential case 80 and the ring gear 78 rotate as long as the rotation is in the same direction, although the rotation speed is changed. In this manner, when the ring gear 78 rotates, the jointed drive pinion 76 and rear-wheel side of the multi-plate clutch mechanism 72 disadvantageously rotate. Although this driving-force transmitting unit 16 from the bevel gear 62 to the ring gear 78 is a portion not required to rotate in the two-wheel drive mode, this portion rotate to cause viscous drag of oil, friction loss of a bearing portion, and others, thereby causing a loss of the driving force and inviting a decrease in fuel efficiency. To get around this, in the present embodiment, in the two-wheel drive mode, the first disengaging mechanism 20 and the second disengaging mechanism 22 are cut off to cut off transmission of the driving force from the engine 28 and the driving force from the rear wheels, thereby preventing rotation of the driving-force transmitting unit 16 from the bevel gear 62 to the ring gear 78. That is, when the second disengaging mechanism 22 is cut off to cut the joint of the side gear 88 and the right-rear-wheel driving shaft 92, the rotation of the right-rear wheel 102 is not transmitted to the side gear 88, and therefore the rotation of the side gear 86 by the left-rear wheel 100 rotates the side gear 88 in a reverse direction via the pinions 82 and 84. At this time, since the rotational resistance of the drive pinion 76 leading to the ring gear 78 and the multi-plate clutch mechanism 72 is larger than the rotational resistance of the side gear 88, the ring gear 78 does not rotate. In the four-wheel drive mode, with the first disengaging mechanism 20 being connected, the driving force from the change gear 30 rotates the bevel gear 62 from the ring gear 34 and the differential case 36 of the front-wheel differential device 14 via the first disengaging mechanism 20 in a connected state. After the direction is converted by the output pinion 64, the driving force is input to the ring gear 78 of the rear-wheel differential device 18 via the universal joint 66, the propeller shaft 68, the universal joint 70, the electronic-control coupling device 24, and the drive pinion 76. With the second disengaging mechanism 22 being connected, the rear-wheel differential device 18 effectively operates, thereby allowing transmission of the driving force via the rear-wheel differential device 18 to the left-rear wheel 100 and the right-rear wheel 102 for rotation. As a matter of course, either of the two-wheel drive mode and the four-wheel drive mode, the driving force from the drive gear 32 of the change gear 30 can be transmitted to the left-front-wheel driving shaft 46 and the right-front-wheel driving shaft 48 via the front-wheel differential device 14 to rotate the left-front wheel 50 and the right-front wheel 52.

Next, switching control from the two-wheel drive mode to the four-wheel drive mode or from the four-wheel drive mode to the two-wheel drive mode in the first embodiment is described with reference to FIG. 3 to FIG. 5. In the two-wheel drive mode, since the first disengaging mechanism 20 is cut off, the driving force from the engine 28 is not transmitted to the rear-wheel differential device 18. Since the second disengaging mechanism 22 is also cut off, the rear-wheel differential device 18 is driven by the left-rear wheel 100, and the side gear 88 is idled via the pinions 82 and 84 in a direction reverse to that of the side gear 86. In switching from the two-wheel drive mode to the four-wheel drive mode, the actuator 98 is first operated with the control signal E2 of the ECU 26 to start synchronization of the second disengaging mechanism 22, that is, to start synchronization between the side gear shaft 136 and the right-rear-wheel driving shaft 92 that are different in rotating direction. Next, when the rotation speed of the bevel gear shaft 56 and the rotation speed of the differential case shaft 54 of the first disengaging mechanism 20 match each other, or when the difference in rotation speed is decreased to a predetermined range, the actuator 60 is operated with the control signal E1 of the ECU 26 to connect the first disengaging mechanism 20.

In FIG. 5, the pinion 158 is rotated by the servo motor in a Q direction, and the shift rod 156 and the shift fork 154 move in a J direction via the rack 156a engaging with the pinion 158. A teeth portion 154a of the shift force 154 engaging the groove portion 152a moves the clutch sleeve 152 in a coupling direction, the balk ring 148 also moves in a left direction via the insert keys 150 engaging with the clutch sleeve 152, thereby bringing the friction surface 148a of the balk ring 148 and the friction surface 136d of the synchro-cone 136c into contact. With a friction force occurring from both of the friction surfaces, the driving force of the right-rear wheel 102 via the right-rear-wheel driving shaft 92 is gradually transmitted to the side gear shaft 136 to start synchronization. With the rotating direction of the side gear shaft 136 being reversed to the same direction of the right-rear-wheel driving shaft 92, the ring gear 78 starts rotating.

In FIG. 3, the driving force from the left-rear wheel 100 and the right-rear wheel 102 is transmitted from the ring gear 78 to the drive pinion 76 to rotate the universal joint 70, the propeller shaft 68, the universal joint 66, the output pinion 64, and the bevel gear 62 via the electronic-control coupling device 24. That is, with the start of synchronization of the second disengaging mechanism 22, the rotation speed of the driving-force transmitting unit 16 increases. Here, the driving-force transmitting unit 16 configures a change gear ratio between the front and rear wheels so that the bevel gear shaft 56 of the first disengaging mechanism 20 rotates at a speed higher than that of the differential case shaft 54 at the time of completion of synchronization of the second disengaging mechanism 22, with the first disengaging mechanism 20 being in a cut-off state. Therefore, when synchronization of the second disengaging mechanism 22 starts, the bevel gear shaft 56 of the first disengaging mechanism 20 starts rotating, and the difference in rotation speed between the bevel gear shaft 56 and the differential case shaft 54 starts decreasing. Upon completion of synchronization of the second disengaging mechanism 22, the rotation speed of the bevel gear shaft 56 becomes above the rotation speed of the opposing differential case shaft 54, thereby reversing the direction of the difference in rotation speed. As in the present embodiment, in order to set a change gear ratio so that a rear-wheel side rotates at a speed higher than that of a front-wheel side, for example, the gear ratio between the ring gear 78 and the drive pinion 76 on a rear-wheel side is set larger than the gear ratio between the bevel gear 62 and the output pinion 64 on a front-wheel side. In this manner, with the change gear ratio between the front and rear wheels being configured to control the first disengaging mechanism 20 and the second disengaging mechanism 22, it is infallibly possible to bring about a state in which there is no difference in rotation speed between the differential case shaft 54 and the bevel gear shaft 56, which are input and output shafts of the engaging clutch mechanism 58, that is, a state in which the engaging clutch mechanism 58 can be quickly and reliably connected with a small force. Therefore, between the start and completion of synchronization of this second disengaging mechanism 22, when the rotation speed of the bevel gear shaft 56 matches the rotation speed of the opposing differential case shaft 54 or when the difference in rotation speed is within a predetermined range, the actuator 60 is operated with the control signal E1 of the ECU 26.

In FIG. 4, when the servo motor rotates the pinion 126 in a Q direction with the control signal E1 of the ECU 26, the shift rod 120 moves in a J direction via the rack 120a engaging with the pinion 126. Being pushed by the snap ring 124 fixed to the shift rod 120, the shift fork 118 moves in a left direction against the pressing force of the springs 122, and the teeth portion 118a of the shift fork 118 engaging with the groove portion 116a moves the coupling sleeve 116 in a left direction. Since the rotation speed of the coupling sleeve 116 and that of the differential case shaft 54 match each other, the coupling sleeve 116 engages with the teeth portion 54a of the differential case shaft 54 to become in a coupled state, and the first disengaging mechanism 20 is connected.

In FIG. 5, the shift rod 156 and the shift fork 154 further move in a J direction and synchronization of the second disengaging mechanism 22 is completed, the relative speed between the nail portion 152b of the clutch sleeve 152 and the nail portion 136b of the side gear shaft 136 becomes zero, thereby allowing the clutch sleeve 152 to be further moved to engage the nail portion 152b and the nail portion 136b with each other. When synchronization of the second disengaging mechanism 22 is completed to stop the movement of the balk ring 148, the clutch sleeve 152 presses and overpasses the insert keys 150 against the springs 160 to further move in a left direction. With the nail portion 152b engaging with the nail portion 136b of the side gear shaft 136, the second disengaging mechanism becomes in a connected state.

In FIG. 3, after the first disengaging mechanism 20 is connected, when synchronization is completed and the second disengaging mechanism 22 is also connected, the driving force from the engine 28 is transmitted also to the left-rear wheel 100 and the right-rear wheel 102 via the driving-force transmitting unit 16 and the rear-wheel differential device 18, thereby bringing about the four-wheel drive mode in which the ECU 26 controls the transmission torque of the electronic-control coupling device 24 according to the running state.

In switching from the four-wheel drive mode to the two-wheel drive mode, the engine 28 and the electronic-control coupling device 24 are first controlled by the ECU 26 to cause a coast torque (a torque from a rear-wheel side via the driving-force transmitting unit 16) to act on the first disengaging mechanism 20, and then the actuator 60 is operated with the control signal E1 of the ECU 26 to move the shift rod 120 to a released position, thereby causing the first disengaging mechanism 20 to be in a cut-off wait state. Next, the actuator 98 is operated with the control signal E2 of the ECU 26 to start cutting off the second disengaging mechanism 22. Then, when the direction of the torque acting on the first disengaging mechanism 20 is transformed, that is, when the coast torque is transformed to a drive torque (a torque from an engine 28 side), at a timing when the torque becomes zero, the coupling sleeve 116 moves in a released direction to cut off the first disengaging mechanism 20. In FIG. 3, since the driving-force transmitting unit 16 has a change gear ratio such that the rear-wheel side rotates at a speed higher than that of the front-wheel side, in the state where the driving force from the engine 28 is not added, such as the case of inertia running in the four-wheel drive mode, a coast torque acts on the first disengaging mechanism 20.

Figure 2:
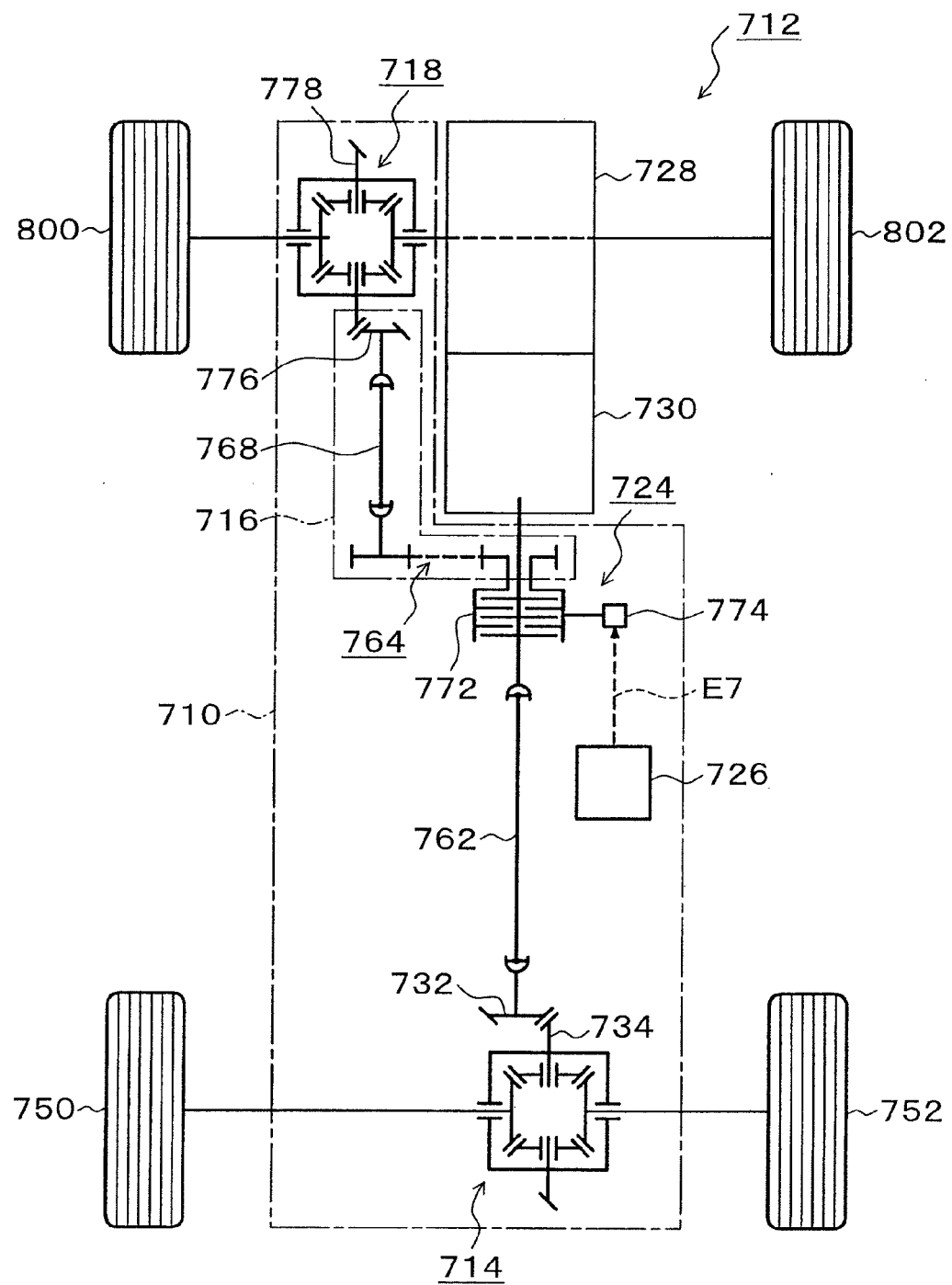
FIG. 2 is an illustrative diagram depicting a conventional driving-force transmitting apparatus for an FR-vehicle-base four-wheel-drive vehicle.

In FIG. 2, in the state where a coast torque acts on the first disengaging mechanism 20, when the servo motor rotates the pinion 126 in a P direction with the control signal E1 of the ECU 26, the shift rod 120 moves in a K direction via the rack 120a engaging with the pinion 126. The shift fork 118 is to be moved with the pressing force of the springs 122 in a right direction, that is, a direction of releasing the coupling sleeve 116. However, since the friction force occurring between the groove portions 54a and 56a from a coast torque acting on the coupling sleeve 116 is larger, movement of the coupling sleeve 116 is inhibited, and the first disengaging mechanism 20 becomes in a cut-off wait state.

In FIG. 5, after the first disengaging mechanism 20 becomes in a cut wait state, when the servomotor rotates the pinion 158 in a P direction with the control signal E2 of the ECU 26, the shift rod 156 and the shift fork 154 move in a K direction via the rack 156a engaging with the pinion 158. When the teeth portion 154a of the shift fork 154 engaging with the groove portion 152a moves the clutch sleeve 152 in a right direction, the engagement between the nail portion 152b and the nail portion 136b of the side gear shaft 136 is released. Also, the pressing between the friction surface 148a of the balk ring 148 and the friction surface 136d of the synchro-cone 136c is released.

In FIG. 4, with the second disengaging mechanism 22 being cut off, the coast torque via the driving-force transmitting unit 16 is decreased.

When the direction of the torque acting on the first disengaging mechanism 20 is transformed, that is, when the coast torque is transformed to a drive torque, the torque acting on the coupling sleeve 116 becomes near zero. When the friction force occurring between the coupling sleeve 116 and the groove portions 54a and 56a becomes below the pressing force of the springs 122 to move in a direction of releasing the coupling sleeve 116, the coupling sleeve 116 moves in the releasing direction, and the first disengaging mechanism 20 is cut off.

In FIG. 5, the shift rod 156 and the shift fork 154 further move in a K direction, and when the contact between the friction surface 148a of the balk ring 148 and the friction surface 136d of the synchro-cone 136c is completely released, the second disengaging mechanism 22 becomes in a cut-off state.

In FIG. 3, when the first disengaging mechanism 20 and the second disengaging mechanism are cut off, the driving force from the engine 28 and the driving force from the left-rear wheel 100 and the right-rear wheel 102 are not transmitted to the driving-force transmitting unit 16, and the driving-force transmitting unit 16 does not rotate.

Therefore, the state becomes in the two-wheel drive mode of preventing a decrease in fuel efficiency due to friction loss.

Figure 6A:
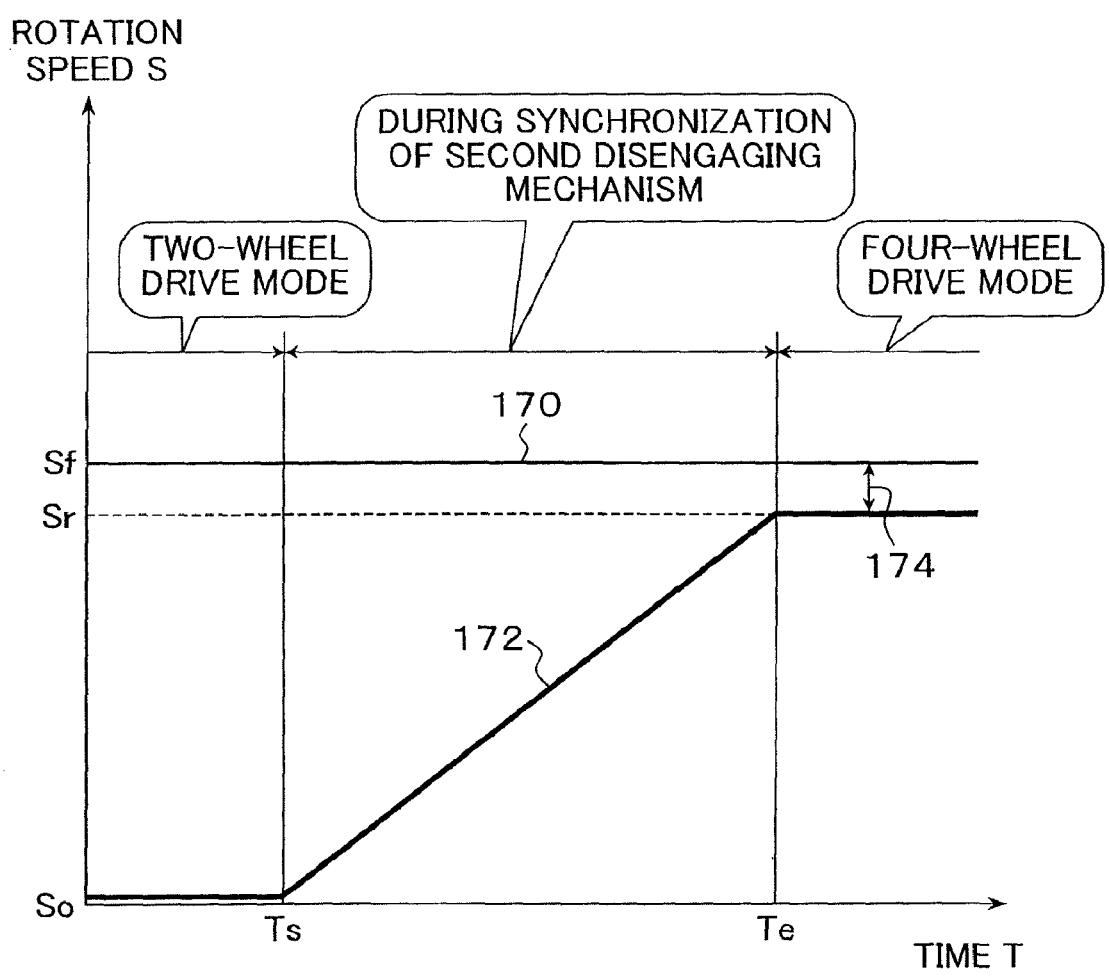
FIGS. 6A and 6B are illustrative diagrams depicting connectable conditions of the first disengaging mechanism of FIG. 3.
Figure 6B:
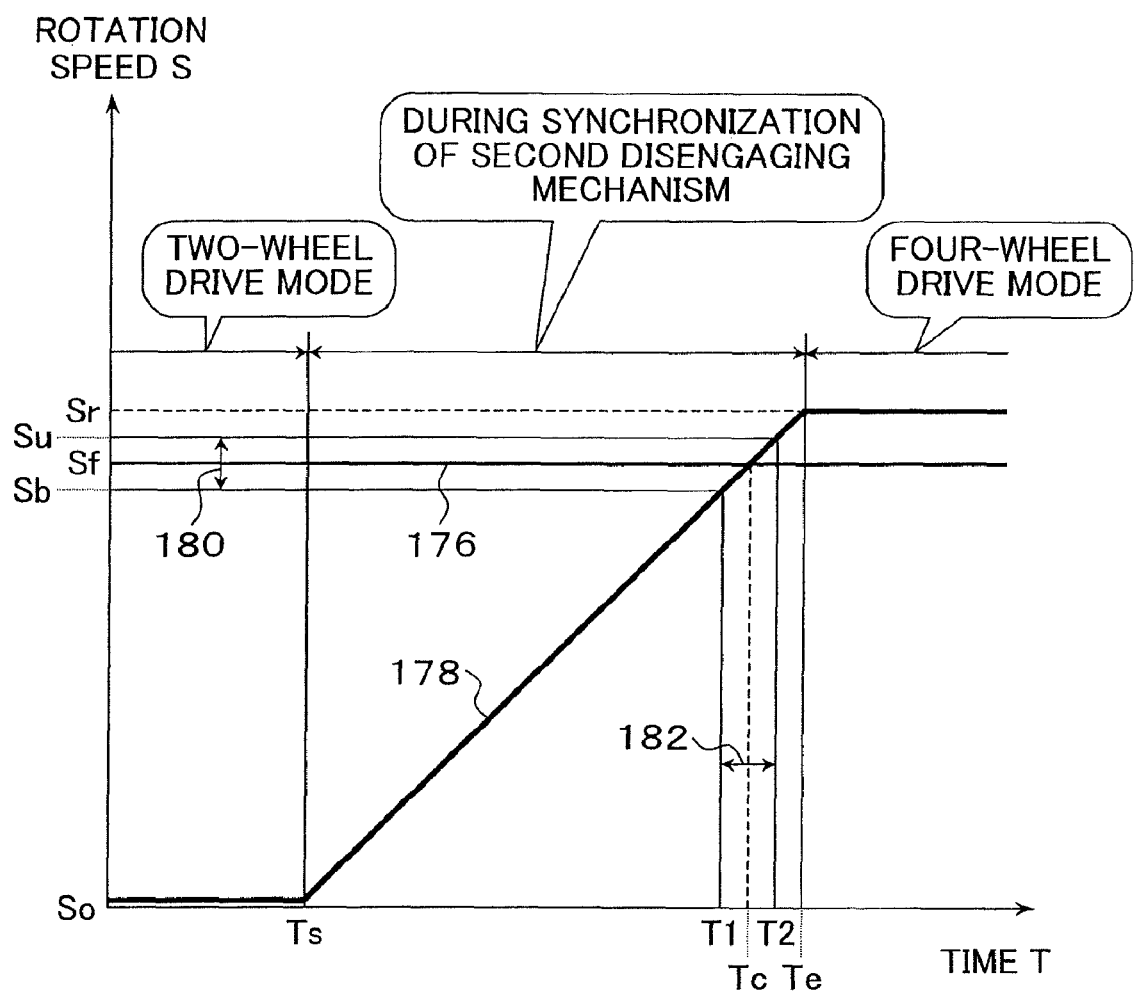

FIGS. 6A and 6B are illustrative diagrams depicting connectable conditions of the first disengaging mechanism 20 of FIG. 3, representing, as graphs with the vertical axis indicating a rotation speed S and the horizontal axis indicating a time T, a progress of a rotation speed (F in FIG. 3) on a differential case side (differential case shaft 54) and a rotation speed (R in FIG. 3) on a bevel gear side (bevel gear shaft 56) when the first disengaging mechanism 20 is connected.

FIG. 6A depicts the case in which, in the conventional structure in which a difference in change gear ratio is not provided between the front and rear wheels, the first disengaging mechanism 20 becomes unconnectable when, for example, a difference occurs in dynamic radius of the front and rear wheels. FIG. 6B depicts the case in which, at the time of completion of synchronization of the second disengaging mechanism 22, the change gear ratio between the front and rear wheel is configured so that a bevel gear side (a driving-force transmitting unit 16 side) of the first disengaging mechanism 20 rotates at a speed higher than that of a differential case side (an opposing side). In FIG. 6A, in switching from the two-wheel drive mode to the four-wheel drive mode, a differential-case-side rotation speed 170 progresses at a predetermined Sf. Also, a bevel-gear-side rotation speed 172 increases from So to Sr from a synchronization start time Ts to a synchronization complete time Te of the second disengaging mechanism 22, but does not reaches Sf of the differential-case-side rotation speed 170 due to a difference in dynamic radius between the front and rear wheels. Reasons for the occurrence of a difference in dynamic radius between the front and rear wheels can include a difference in tire air pressure between the front and rear wheels, a difference in tire-wear degree between the front and rear wheels, a difference in load between a front-wheel side and a rear-wheel side, and a difference in tire diameter between the front and rear wheels because tires of the same specifications but different brands are mounted as the front and rear wheels. When these differences are combined, the difference can exceed 5% of the dynamic radius.

For example, when there is no difference in change gear ratio between the front and rear wheels and an average value of dynamic radiuses between the left- and right-rear wheels is larger than an average value of those between the left- and right-front wheels by 3%, the rotation speed on the bevel gear side is smaller than that on the differential case side of the first disengaging mechanism 20 by 3% at the completion of synchronization of the second disengaging mechanism 22. In FIG. 6A, a difference in rotation speed 174 continues between the differential-case-side rotation speed 170 and the bevel-gear-side rotation speed 172 after the synchronization complete time Te, thereby making it difficult to smoothly connect the first disengaging mechanism without a synchronizing function. Therefore, even with switching to the four-wheel drive mode, a state occurs in which a transition from two-wheel drive to four-wheel drive cannot be made.

Also in FIG. 6B, in switching from the two-wheel drive mode to the four-wheel drive mode, a differential-case-side rotation speed 176 progresses at the predetermined Sf, and a bevel-gear-side rotation speed 178 increases from So to Sr from the synchronization start time Ts to the synchronization complete time Te of the second disengaging mechanism 22. However, unlike the case of FIG. 6A, since a difference in change gear ratio is provided between the front and rear wheels, the bevel-gear-side rotation speed 178 exceeds Sf of the differential-case-side rotation speed 176 at a time Tc, and reaches Sr at the synchronization complete time Te of the second disengaging mechanism 22. Therefore, in FIG. 6B, the difference in rotation speed between both sides disappears at the time Tc when the differential-case-side rotation speed 176 and the bevel-gear-side rotation speed 178 cross each other. Therefore, at this timing, the first disengaging mechanism 20 can be smoothly connected with a small force. Also, in the case where the mechanism can be connected even with a difference in rotation speed to some degree, a connectable range 180 is taken as an allowable range of that difference in rotation speed, and times T1 to T2 corresponding to a lower limit Sb to an upper limit Su of the rotation speed represent a connection timing 182.

Figure 7B:
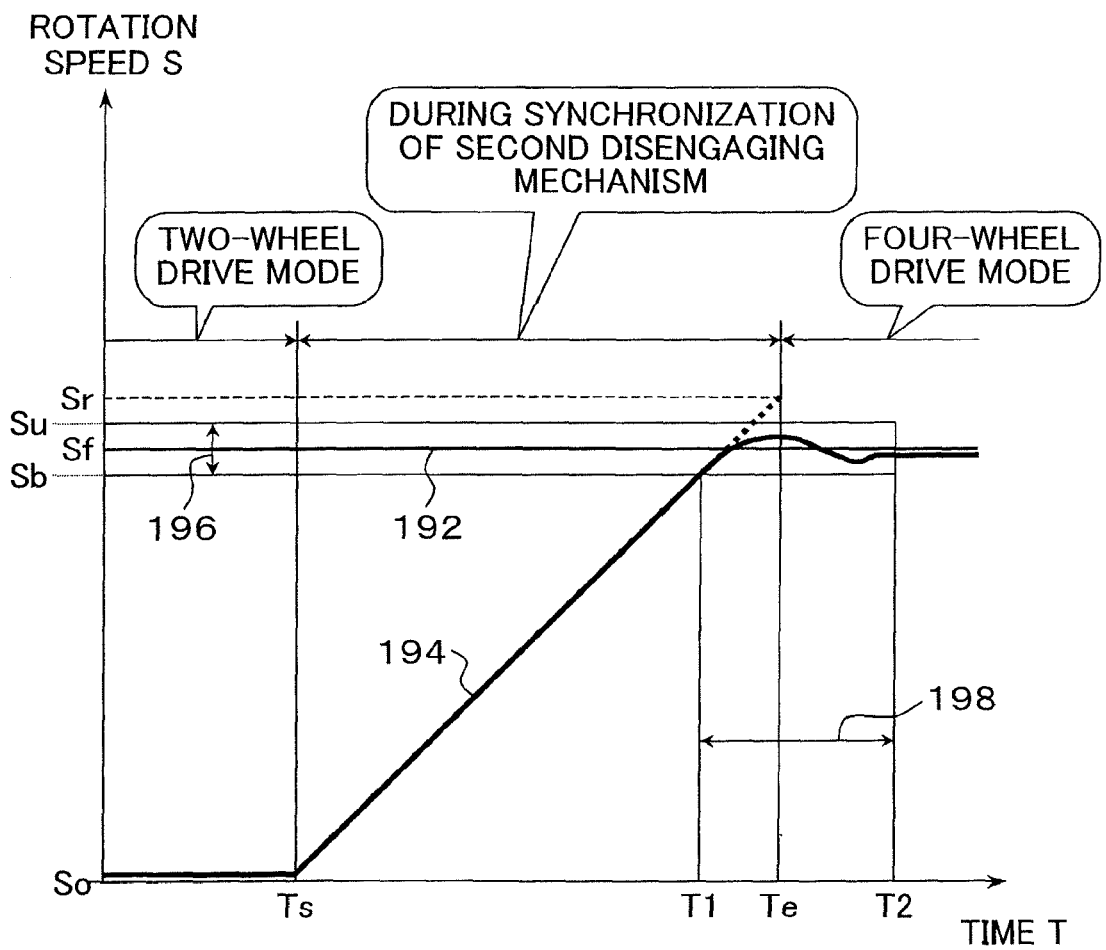

FIGS. 7A and 7B are illustrative diagrams depicting connection control of the first disengaging mechanism 20 of FIG. 3. As with FIG. 6B, a difference is provided to the change gear ratio between the front and rear wheels, and the rotation speed on the bevel gear side is actively controlled. As graphs with the vertical axis indicating a rotation speed S and the horizontal axis indicating a time T, the figures represent a progress of a rotation speed (F in FIG. 1) on a differential case side and a rotation speed (R in FIG. 1) on a bevel gear side when the first disengaging mechanism 20 is connected.

FIG. 7A represents control such that a bevel-gear-side rotation speed 186 again enters a connectable range 188 after synchronization of the second disengaging mechanism 22 is once completed.

FIG. 7B represents control such that the bevel-gear-side rotation speed 186 enters the connectable range 188 before synchronization of the second disengaging mechanism 22 is completed.

In FIG. 7A, in switching from the two-wheel drive mode to the four-wheel drive mode, a differential-case-side rotation speed 184 progresses at a predetermined Sf. The bevel-gear-side rotation speed 186 starts increasing from So at the synchronization start time Ts of the second disengaging mechanism 22, exceeds Sf of the differential-case-side rotation speed 176 at the time Tc, and reaches Sr at the synchronization complete time Te. Then, by adjusting synchronization of the second disengaging mechanism 22, the bevel-gear-side rotation speed 186 is controlled to be within the connectable range 188, and a connection timing 190 starts at the time T1 corresponding to an upper limit Su of the rotation speed in the connectable range 188. When the first disengaging mechanism 20 is connected at the time T2, the bevel-gear-side rotation speed 186 matches Sf of the differential-case-side rotation speed 184. For controlling the bevel-gear-side rotation speed 186, the electronic-control coupling device 24 included in the driving-force transmitting unit 16 can be used. Also, the second disengaging mechanism 22 and the electronic-control coupling device 24 can be used in combination, and a method of controlling the bevel-gear-side rotation speed 186 is selected as appropriate. Here, when only the second disengaging mechanism 22 is used for controlling the bevel-gear-side rotation speed 186, although synchronization of the second disengaging mechanism 22 is not yet completed at the time of connection of the first disengaging mechanism 20, synchronization of the second disengaging mechanism 22 can be completed for connection by adjusting the transmission torque of the electronic-control coupling device 24.

In FIG. 7B, in switching from the two-wheel drive mode to the four-wheel drive mode, a differential-case-side rotation speed 192 progresses at a predetermined Sf. A bevel-gear-side rotation speed 194 starts increasing from So at the synchronization start time Ts of the second disengaging mechanism 22. By adjusting synchronization of the second disengaging mechanism 22 from the time T1 when the rotation speed reaches the lower limit Sb of the rotation speed in a connectable range 196, the bevel-gear-side rotation speed 194 is controlled within the connectable range 196, and a connection timing 198 starts at the time T1 corresponding to the lower limit Sb of the rotation speed in the connectable range 196. When the first disengaging mechanism 20 is connected at the time T2, the bevel-gear-side rotation speed 194 matches Sf of the differential-case-side rotation speed 192. Also in FIG. 7B, as with FIG. 7A, the electronic-control coupling device 24 can be used for controlling the bevel-gear-side rotation speed 194. Also, the second disengaging mechanism 22 and the electronic-control coupling device 24 can be used in combination. Also, when only the electronic-control coupling device 24 is used for controlling the bevel-gear-side rotation speed 186, irrespective of control of the bevel-gearside rotation speed 186, the second disengaging mechanism 22 can complete synchronization at the time T2 for connection.

Figure 8:
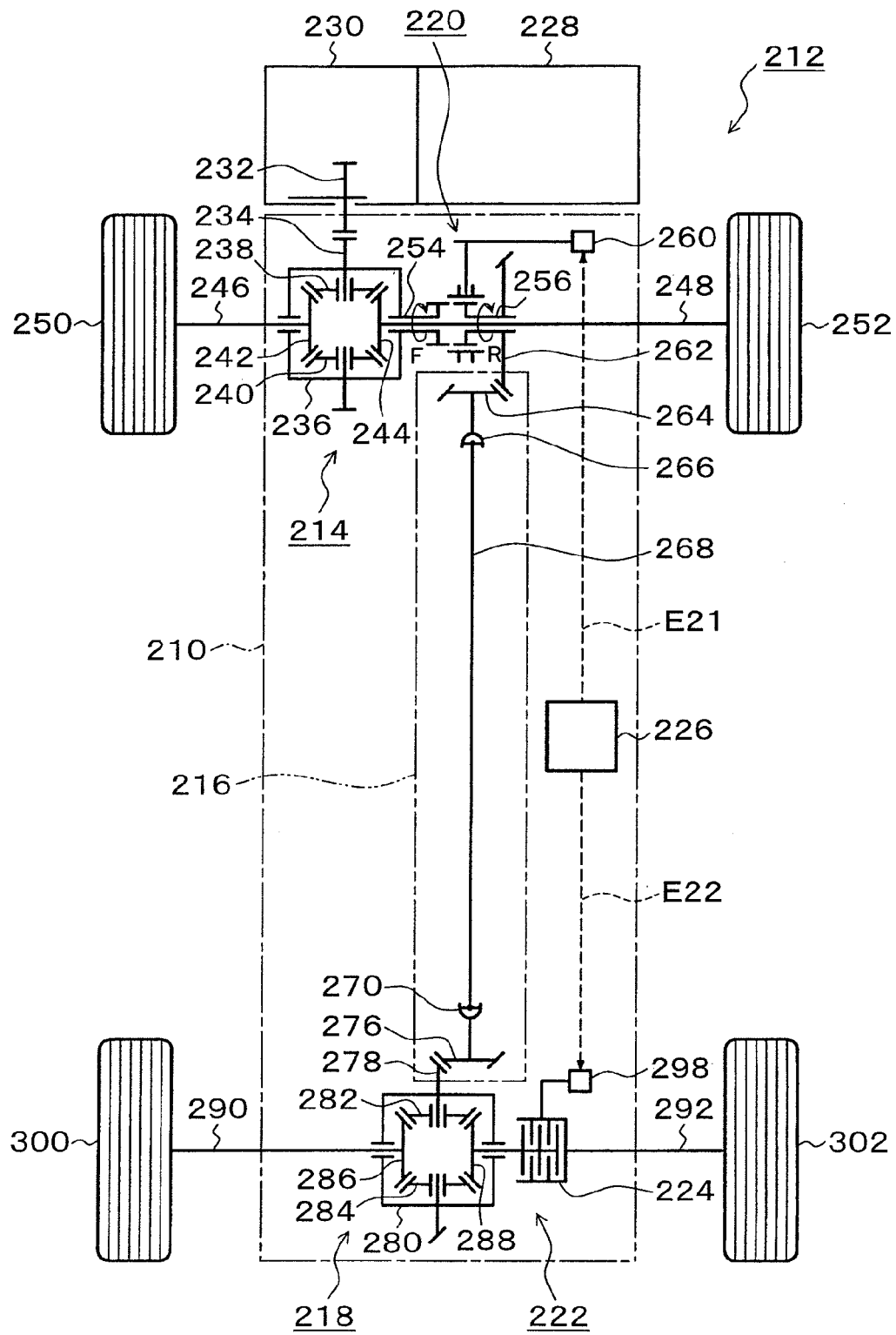
FIG. 8 is an illustrative diagram depicting a second embodiment of the driving-force transmitting apparatus for a four-wheel-drive vehicle according to the present invention.

FIG. 8 is an illustrative diagram depicting a second embodiment of the driving-force transmitting apparatus for a four-wheel-drive vehicle according to the present invention, where the apparatus is applied to an FF-vehicle-base four-wheel-drive vehicle. The present embodiment is substantially identical in structure to the first embodiment depicted in FIG. 3, except that an electronic-control coupling device is disposed as a second disengaging mechanism. In FIG. 8, a driving-force transmitting apparatus 210 of the present embodiment is provided to a four-wheel-drive vehicle 212, and includes a front-wheel differential device 214, a driving-force transmitting unit 216, and a rear-wheel differential device 218. Also, a first disengaging mechanism 220 is provided between the front-wheel differential device 214 and the driving-force transmitting unit 216, and a second disengaging mechanism 222 is provided between the rear-wheel differential device 218 and a right-rear wheel 302. To the first disengaging mechanism 220 and the second disengaging mechanism 222 of the driving-force transmitting apparatus 210, control signals E21 and E22 are given from an ECU 226. After the speed of a driving force from an engine 228 is changed by a change gear 230, the driving force is input from a drive gear 232 of the change gear 230 to the front-wheel differential device 214. The front-wheel differential device 214 transmits the driving force from the change gear 230 to a left-front wheel 250 and a right-front wheel 252. The front-wheel differential device 214 is configured of a ring gear 234 engaging with the drive gear 232, a differential case 236 having the ring gear 234 fixed thereto, pinions 238 and 240 rotatably and axially supported inside of the differential case 236, and side gears 242 and 244 engaging with the pinions 238 and 240. A driving force from the drive gear 232 is received by the ring gear 234 to drive a left-front-wheel driving shaft 246 and a right-front-wheel driving shaft 248 via the pinions 238 and 240 and the side gears 242 and 244 and rotate the left-front wheel 250 and the right-front wheel 252. With this, the driving force is transmitted onto a road surface.

When a difference in rotation speed occurs between the left-front wheel 250 and the right-front wheel 252 at the time of cornering or due to a change of a road surface state or the like, the front-wheel differential device 214 absorbs the rotation speed to provide the same torque to the left-front wheel 250 and the right-front wheel 252 for rotation. The driving force from the drive gear 232 is input also to the first disengaging mechanism 220 via the ring gear 234 and the differential case 236 of the front-wheel differential device 214. In the two-wheel drive mode, the first disengaging mechanism 220 is in a state of disengaging the driving-force transmitting unit 216 by an operation with the control signal E21 from the ECU 226 and cutting off the driving force to a rear-wheel side.

Therefore, in the two-wheel drive mode, the driving force from the engine 228 is not transmitted to a rear-wheel side via the driving-force transmitting unit 216. On the other hand, in the four-wheel drive mode, the first disengaging mechanism 220 is in a state of being connected to the driving-force transmitting unit 216 by an operation with the control signal E21 from the ECU 226. Therefore, the driving force input to a differential case shaft 254 integrally formed on the differential case 236 is transmitted to a bevel gear shaft 256, and the transmitting direction is converted by a bevel gear 262 and an output pinion 264 fixed to the bevel gear shaft 256 for output. The driving force output from the output pinion 264 is transmitted to a drive pinion 276 via a universal joint 266, a propeller shaft 268, and a universal joint 270, and the direction is converted and transmitted from the drive pinion 276 to the ring gear 278 of the rear-wheel differential device 218. The rear-wheel differential device 218 is configured of a ring gear 278 engaging with the drive pinion 276, a differential case 280 having the ring gear 278 fixed thereto, pinions 282 and 284 rotatably and axially supported inside of the differential case 280, and side gears 286 and 288 engaging with the pinions 282 and 284. Via a left-rear-wheel driving shaft 290 jointed to the side gear 286 and the second disengaging mechanism 222 and a right-rear-wheel driving shaft 292 jointed to the side gear 288, the left-rear wheel 300 and the right-rear wheel 302 are rotated to cause the driving force to be transmitted onto the road surface. In the present embodiment, a multi-plate clutch mechanism 224 is used as the second disengaging mechanism 222. The multi-plate clutch mechanism 224 is provided at some point of the right-rear-wheel driving shaft 292 jointing the rear-wheel differential device 218 and the right-rear wheel 302 to disengage the driving force to the right-rear wheel 302. In the two-wheel drive mode, the multi-plate clutch mechanism 224 operates an actuator 298 with the control signal E22 from the ECU 226, and is controlled to be in a released state in which no driving force is transmitted, disengaging transmission of the driving force between the right-rear wheel 302 and the rear-wheel differential device 218. In the four-wheel drive mode, the multi-plate clutch mechanism 224 operates the actuator 298 with the control signal E22 from the ECU 226 according to a signal from a vehicle-state detection sensor (not shown), and is optimally controlled between a released state in which no driving force is transmitted (two-wheel drive state) and a directly-connected state in which a maximum driving force is transmitted, thereby transmitting the driving force from the engine 228 to the right-rear wheel 302 and the left-rear wheel 300 via the rear-wheel differential device 218. That is, in the four-wheel drive mode, the rear-wheel differential device 218 effectively operates. Even when a difference in rotation speed occurs between the left-rear wheel 300 and the right-rear wheel 302 at the time of cornering or due to a change of a road surface state or the like, the rear-wheel differential device 218 can absorb the difference in rotation speed to provide the same torque to the left-rear wheel 300 and the right-rear wheel 302 for rotation. In the present embodiment, an engaging clutch mechanism 258 is used as the first disengaging mechanism 220. With a shift operation by an actuator 260, switching is made between a cut-off state as the two-wheel drive mode and a connected state in the four-wheel drive mode. Since the first disengaging mechanism 220 is substantially identical to the first disengaging mechanism 20 of the first embodiment, detailed description is omitted (refer to FIG. 2).

Figure 9:
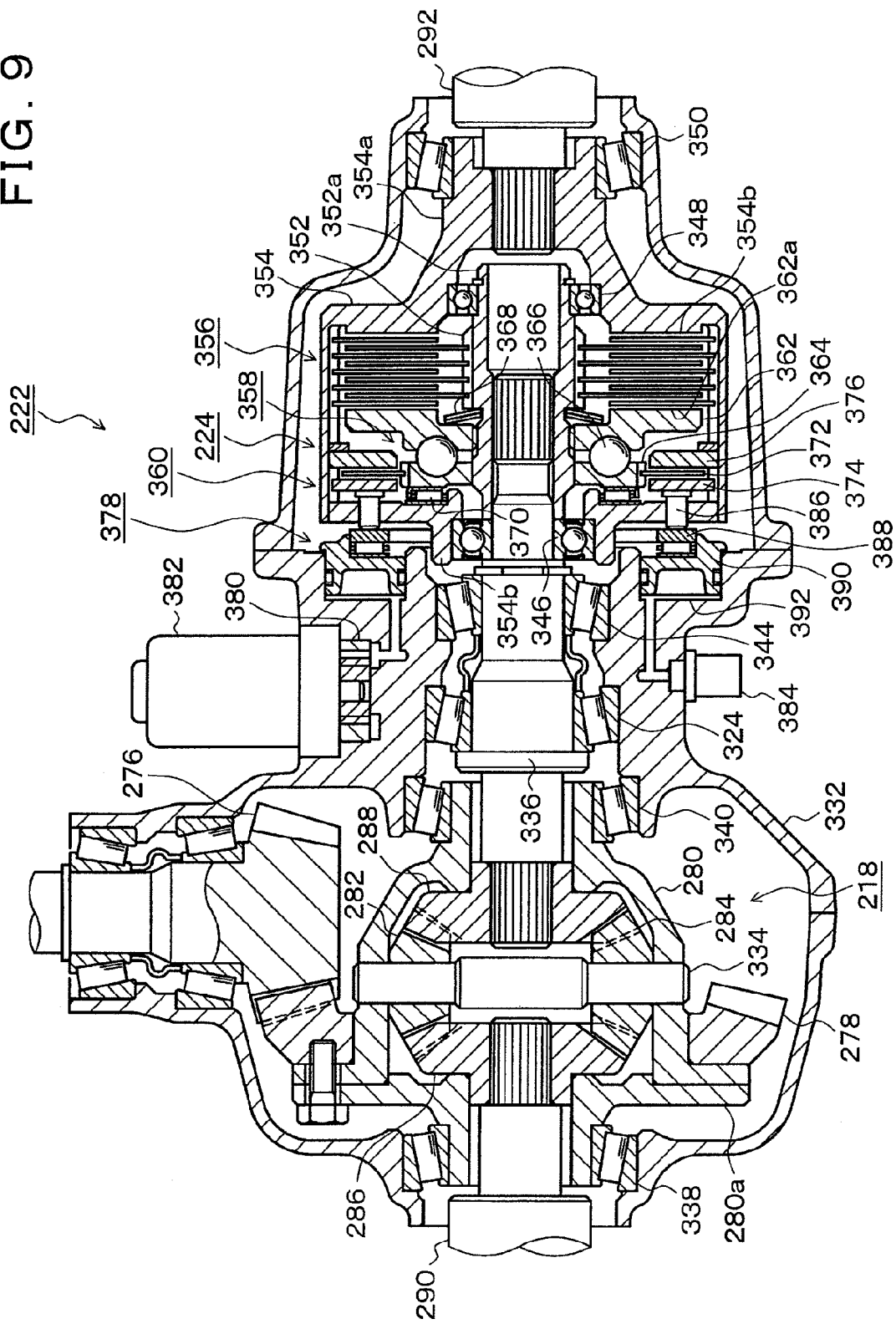
FIG. 9 is a section view depicting an embodiment of a rear-wheel differential device and a second disengaging mechanism of FIG. 8.

FIG. 9 is a section view depicting the rear-wheel differential device 218 and the second disengaging mechanism 222 of FIG. 8, and an upper portion of the drawing represents a front side (forward direction) of the four-wheel-drive vehicle 212. In FIG. 9, the drive pinion 276, the rear-wheel differential device 218, and the second disengaging mechanism 222 are accommodated in a housing 332.

The rear-wheel differential device 218 positioned on a left side of the housing 332 includes the ring gear 278 fixed to a flange portion 280a of the differential case 280, the pinions 282 and 284 rotatably and axially supported to a pinion shaft 334 fixed to the differential case 280, the side gear 286 rotatably and axially supported to the differential case 280 and non-rotatably coupling the left-rear-wheel driving shaft 290, and the side gear 288 rotatably and axially supported to the differential case 280 and non-rotatably coupling a side gear shaft 336. The ring gear 278 engages with the drive pinion 276 jointed to the propeller shaft 268 via the universal joint 270. The side gears 286 and 288 engage with the pinions 282 and 284, respectively. The differential case 280 has its left-rear-wheel driving shaft 290 side and side gear shaft 336 side both rotatably supported to the housing 332 by taper roller bearings 338 and 340, respectively. The side gear shaft 336 has its center portion rotatably supported to the housing 332 by taper roller bearings 342 and 344. On a right side of the housing 332, the second disengaging mechanism 222 is provided. In the present embodiment, the second disengaging mechanism 222 is configured of the multi-plate clutch mechanism 224 that is oil-hydraulically controlled, successively changing a coupling force of the multi-plate clutch mechanism 224 in four-wheel drive to control distribution of the driving force to be transmitted to the left-rear wheel 300 and the right-rear wheel 302. The multi-plate clutch mechanism 224 includes a clutch hub 352 having a driving force inputted thereto from the side gear shaft 336, a clutch drum 354 disposed coaxially to the clutch hub 352 to non-rotatably connect the right-rear-wheel driving shaft 292 to a right end portion 354a, a ball cam mechanism 358 that presses a multi-plate clutch 356 provided between the clutch hub 352 and the clutch drum 354, and a primary clutch 360 that drives the ball cam mechanism 358. The clutch drum 354 has a right end portion 354a rotatably supported by a taper roller bearing 350 to the housing 332 and a left end portion 354b rotatably supported to the side gear shaft 336 by a ball bearing 346.

Also, the clutch hub 352 non-rotatably holds the side gear shaft 336 inserted to fit therein from a left end portion, and also has a right end portion 352a rotatably held to the clutch drum 354 by a ball bearing 348. The ball cam mechanism 358 holds a ball 366 interposed between a pair of pressing cam plates 362 relatively rotatably and coaxially provided to the clutch hub 352 and a ball cam groove of an opposing cam surface of a rotation cam plate 364. The multi-plate clutch 356 is held between a pressing portion 362a of the pressing cam plates 362 and a pressure-receiving unit 354b of the clutch drum 354 so as to be movable in an axial direction with respect to the clutch hub 352 or the clutch drum 354. The pressing cam plates 362 makes spline coupling with the clutch hub 352 to be movable in an axial direction and also to rotate together with the clutch hub 352, and is pressed by a disc spring 368 provided between the pressing cam plates 362 and the clutch hub 352 in a direction of releasing the multi-plate clutch mechanism 224. The rotation cam plate 364 is rotatably held to the clutch hub 352 to rotate together with the pressing cam plates 362 via the ball 366. Between the rotation cam plate 364 and the clutch drum 354, a thrust bearing 370 is provided to absorb a difference in rotation speed from the clutch drum 354. The primary clutch 360 is rotatably held in an axial direction with respect to the rotation cam plate 364 between the clutch drum 354 and the rotation cam plate 364, and includes a clutch plate 372 that rotates together with the rotation cam plate 364. With a pressing plate 374 pressing the clutch plate 372 to couple to a pressure-receiving plate 376 fixed to the clutch drum 354, a difference in rotation speed between the clutch drum 354 and the clutch hub 352 is transmitted to the rotation cam plate 364. An intermediation portion of the housing 332 on the left of the clutch drum 354 includes an oil-hydraulic piston mechanism 378 that controls a coupling force of the multi-plate clutch 356 via the primary clutch 360 and the ball cam mechanism 358, an oil-hydraulic pump 380 that supplies an oil pressure to the oil-hydraulic piston mechanism 378, a servo motor 382 that drives the oil-hydraulic pump 380, and an oil-hydraulic sensor 384 that detects the oil pressure. The pressing plate 374 of the primary clutch 360 joints to a thrust bearing 388 via a pressing shaft 386 slidably penetrating through the clutch drum 354. The thrust bearing 388 engages with a ring-shaped oil-hydraulic piston 390 of the oil-hydraulic piston mechanism 378. The oil-hydraulic piston 390 freely fits inside of an oil-hydraulic cylinder 392 formed in the housing 332, and is movable to a position where the primary clutch 360 is released and a position where it is coupled. When the rotation cam plate 364 is driven by the primary clutch 360 for relative rotation in a predetermined direction with respect to the pressing cam plates 362, the ball cam mechanism 358 is pressed by the ball 366 interposed in a ball cam groove, which is a tilted groove of an opposing face, to press the pressing cam plates 362 and the disc spring 368 in an axial direction. With the pressing portion 362a of the pressing cam plates 362 pressing the multi-plate clutch 356 of the multi-plate clutch mechanism 224, the multi-plate clutch mechanism 224 increases the transmission torque according to the moving amount of the oil-hydraulic piston 390, and becomes in a directly-coupled state at a maximum pressing position. In the present embodiment, to control the coupling force of the multi-plate clutch mechanism 224, an oil-hydraulic actuator implemented by the oil-hydraulic piston mechanism 378 is used. This is not meant to be restrictive to an oil-hydraulic actuator and, for example, an electromagnetic actuator or other actuator can be used. An actuator for use can be selected as appropriate.

In FIG. 9, the state is depicted in which the second disengaging mechanism 222 is cut off in two-wheel drive. The multi-plate clutch 356 is in a released state in which it is not pressed by the pressing cam plates 362, and the side gear shaft 336 and the right-rear-wheel driving shaft 292 are not jointed. Therefore, the driving force from the left-rear wheel 300 and the right-rear wheel 302 is not transmitted to the drive pinion 276. In four-wheel drive, with the oil-hydraulic pump 380 supplying oil pressure to the oil-hydraulic cylinder 392, the oil-hydraulic piston 390 moves in a right direction to actuate the primary clutch 360 via the pressing shaft 386. The primary clutch 360 rotates the rotation cam plate 364 of the ball cam mechanism 358 to move the pressing cam plates 362 via the ball 366 in a direction of coupling the multi-plate clutch 356. When the multi-plate clutch 356 is coupled, the driving force from the drive pinion 276 engaging with the ring gear 278 can be transmitted to the right-rear wheel 102 via the right-rear-wheel driving shaft 292. Here, functions of the driving-force transmitting apparatus 210 in the two-wheel drive mode and the four-wheel drive mode of the second embodiment are described with reference to FIG. 8. In the two-wheel drive mode, with the control signal E21 of the ECU 226, the first disengaging mechanism 220 is cut off. Therefore, the driving force from the change gear 230 is transmitted to the differential case shaft 254 via the ring gear 234 and the differential case 236 of the front-wheel differential device 214. However, since the first disengaging mechanism 220 is in a cut-off state, the driving force is not output to the bevel gear shaft 256.

On the other hand, since the second disengaging mechanism 222 is also cut off with the control signal E22 from the ECU 226, even if the left-rear wheel 300 and the right-rear wheel 302 are rotating, the ring gear 278 of the rear-wheel differential device 218 does not rotate. With this, in the two-wheel drive mode, the rotation of the driving-force transmitting unit 216 including the bevel gear 262, the output pinion 264, the universal joint 266, the propeller shaft 268, the universal joint 270, the drive pinion 276, and the ring gear 278 of the rear-wheel differential device 218 stops, thereby solving the problem of decreasing fuel efficiency due to friction loss caused by the fact that the driving-force transmitting unit 216 rotates in two-wheel drive. In the four-wheel drive mode, with the first disengaging mechanism 220 being connected, the driving force from the change gear 230 rotates the bevel gear 262 from the ring gear 234 and the differential case 236 of the front-wheel differential device 214 via the first disengaging mechanism 220 in a connected state. After the direction is converted at the output pinion 264, the driving force is input to the ring gear 278 of the rear-wheel differential device 218 via the universal joint 266, the propeller shaft 268, the universal joint 270, and the drive pinion 276. With the second disengaging mechanism 222 being connected, the rear-wheel differential device 218 effectively operates. Via the rear-wheel differential device 218, the driving force can be transmitted to the left-rear wheel 300 and the right-rear wheel 302 for rotation. As a matter of course, in either of the two-wheel drive mode and the four-wheel drive mode, the driving force from the drive gear 232 of the change gear 230 is transmitted to the left-front-wheel driving shaft 246 and the right-front-wheel driving shaft 248 via the front-wheel differential device 214 to allow the left-front wheel 250 and the right-front wheel 252 to rotate. Next, switching control from the two-wheel drive mode to the four-wheel drive mode and the four-wheel drive mode to the two-wheel drive mode in the second embodiment is described with reference to FIGS. 6 and 7. In the two-wheel drive mode, since the first disengaging mechanism 220 is cut off, the driving force from the engine 228 is not transmitted to the rear-wheel differential device 218. Since second disengaging mechanism 222 is also cut off, the rear-wheel differential device 218 is driven by the left-rear wheel 300, and the side gear 288 is idled via the pinions 282 and 284 in a direction reverse to that of the side gear 286. In switching from the two-wheel drive mode to the four-wheel drive mode, the actuator 298 is first operated with the control signal E22 of the ECU 226 to start synchronization of the second disengaging mechanism 222, that is, synchronization between the side gear shaft 336 and the right-rear-wheel driving shaft 292 that are different in rotating direction. Next, when the rotation speed of the bevel gear shaft 256 and the rotation speed of the differential case shaft 254 in the first disengaging mechanism 220 match each other, or the difference in rotation speed is decreased to a predetermined range, the actuator 260 is operated with the control signal E21 of the ECU 226 to connect the first disengaging mechanism 220.

In FIG. 9, with the servo motor 382, the oil-hydraulic pump 380 supplies an oil pressure to the oil-hydraulic cylinder 392, and the oil-hydraulic piston 390 moves in a right direction to actuate the primary clutch 360 via the pressing shaft 386. The primary clutch 360 rotate the rotation cam plate 364 of the ball cam mechanism 358 to move the pressing cam plates 362 via the ball 366 in a direction of coupling the multi-plate clutch 356. When coupling of the multi-plate clutch 356 starts, the driving force of the right-rear wheel 302 via the right-rear-wheel driving shaft 292 is gradually transmitted to the side gear shaft 336 to start synchronization. With the rotating direction of the side gear shaft 336 reversed to the same direction of the right-rear-wheel driving shaft 292, the ring gear 278 starts rotating.

In FIG. 8, the driving force from the left-rear wheel 300 and the right-rear wheel 302 is transmitted from the ring gear 278 to the drive pinion 276 to rotate the universal joint 270, the propeller shaft 268, the universal joint 266, the output pinion 264, and the bevel gear 262. That is, with the start of synchronization of the second disengaging mechanism 222, the rotation speed of the driving-force transmitting unit 216 increases. Here, the driving-force transmitting unit 216 configures a change gear ratio between the front and rear wheels so that the bevel gear shaft 256 of the first disengaging mechanism 220 rotates at a speed higher than that of the differential case shaft 254 at the completion of synchronization of the second disengaging mechanism 222, with the first disengaging mechanism 220 being in a cut-off state.

Therefore, when synchronization of the second disengaging mechanism 222 starts, the bevel gear shaft 256 of the first disengaging mechanism 220 starts rotating, and the difference in rotation speed between the bevel gear shaft 256 and the differential case shaft 254 starts decreasing. Upon completion of synchronization of the second disengaging mechanism 222, the rotation speed of the bevel gear shaft 256 becomes above the rotation speed of the opposing differential case shaft 254, thereby reversing the direction of the difference in rotation speed. In this manner, with the change gear ratio between the front and rear wheels being configured to control the first disengaging mechanism 220 and the second disengaging mechanism 222, it is infallibly possible to bring about a state in which there is no difference in rotation speed between the differential case shaft 254 and the bevel gear shaft 256, which are input and output shafts of the engaging clutch mechanism 258, that is, a state in which the engaging clutch mechanism 258 can be quickly and reliably connected with a small force. Therefore, between the start and completion of synchronization of this second disengaging mechanism 222, when the rotation speed of the bevel gear shaft 256 matches the rotation speed of the opposing differential case shaft 254 or when the difference in rotation speed is within a predetermined range, the actuator 260 is operated with the control signal E21 of the ECU 226 to connect the first disengaging mechanism 220.

In FIG. 9, when the oil-hydraulic piston 390 further moves to completely connect the multi-plate clutch 356, synchronization between the right-rear-wheel driving shaft 292 and the side gear shaft 336 is completed, and the second disengaging mechanism becomes in a connected state.

In FIG. 8, after the first disengaging mechanism 220 is connected, when synchronization is completed and the second disengaging mechanism 222 is also connected, the driving force from the engine 228 is transmitted also to the left-rear wheel 300 and the right-rear wheel 302 via the driving-force transmitting unit 216 and the rear-wheel differential device 218, thereby bringing about the four-wheel drive mode in which the ECU 226 controls the transmission torque of the multi-plate clutch mechanism 224 according to the running state.

In switching from the four-wheel drive mode to the two-wheel drive mode, the engine 228 and the second disengaging mechanism 222 are first controlled by the ECU 226 to cause a coast torque (a torque from a rear-wheel side via the driving-force transmitting unit 216) to act on the first disengaging mechanism 220, and then the actuator 260 is operated with the control signal E21 of the ECU 226 to cause the first disengaging mechanism 220 to be in a cut-off wait state, as with FIG. 4 of the first embodiment. Next, with the control signal E22 of the ECU 226, the actuator 298 is operated to start cutting off the second disengaging mechanism 222. Then, when the direction of the torque acting on the first disengaging mechanism 220 is transformed, that is, when the coast torque is transformed to a drive torque (a torque from an engine 228 side), at a timing when the torque becomes zero, the first disengaging mechanism 220 is cut off. After the first disengaging mechanism 220 is cut off, when the second disengaging mechanism 222 also becomes in a cut-off state, the driving force from the engine 228 and the driving force from the left-rear wheel 300 and the right-rear wheel 302 are not transmitted to the driving-force transmitting unit 216, and the driving-force transmitting unit 216 does not rotate. Therefore, the state becomes in the two-wheel drive mode of preventing a decrease in fuel efficiency due to friction loss.

Figure 1:
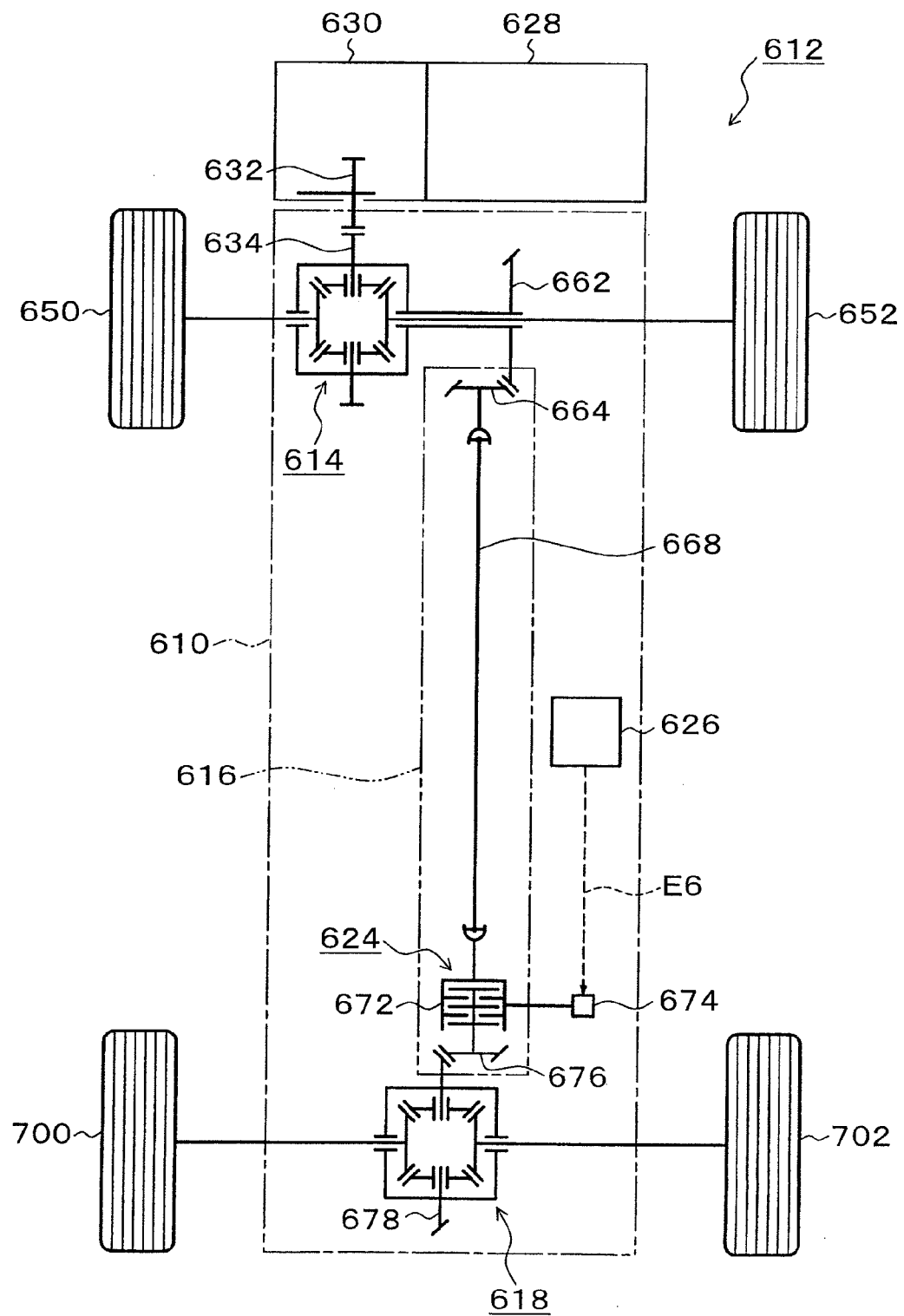
FIG. 1 is an illustrative diagram depicting a conventional driving-force transmitting apparatus for an FF-vehicle-base four-wheel-drive vehicle.

FIGS. 10A and 10B are illustrative diagrams depicting disconnectable conditions of the first disengaging mechanism 20 of FIG. 3 and the first disengaging mechanism 220 of FIG. 8, representing, as a list, a relation between various running states of a four-wheel-drive vehicle and the difference in tire's dynamic radius between the front and rear wheels when the structure is as depicted in FIGS. 1 and 6 but there is no difference provided to the conventional change gear ratio between the front and rear wheels.

In FIG. 10A, to represent connectable conditions of the first disengaging mechanisms 20 and 220, magnitudes of a front-wheel-side rotation speed F and a rear-wheel-side rotation speed R at the time of connection are classified depending on the running pattern and the difference in tire's dynamic radius, and are shown as conditions. Here, as depicted in FIG. 3 and FIG. 9, the front-wheel-side rotation speed F indicates the rotation speed of the differential case shafts 54 and 254, and the rear-wheel-side rotation speed R indicates the rotation speed of the bevel gear shafts 56 and 256.

In FIG. 10A, in a rotation speed table 406, as running patterns, magnitudes of the tire slip of the front wheel and the rear wheel are classified as "large", "small", and "none", and cornering radiuses are classified as "forward", "large", and "small". Also, as tire's dynamic radiuses, magnitudes of the front wheel and the rear wheel are classified as states of "front wheel>rear wheel", "front wheel=rear wheel", and "front wheel<rear wheel". In each condition, a relation in magnitude of the front-wheel-side rotation speed F and the rear-wheel-side rotation speed R is represented as ">", ">>", "<", or "<<", and when both rotation speeds can be regarded as equal, "≈" is used for representation. As described above, for allowing smooth connection of the first disengaging mechanisms 20 and 220, it is a necessary condition that the rear-wheel-side rotation speed R (driving-force transmitting unit side) is larger than the front-wheel-side rotation speed F (opposing side) at the start of connection. Therefore, in the rotation speed table 406, portions of "F>R" and "F>>R" where this condition is not satisfied are displayed as hatched. According to the rotation speed table 406, except the state in which the tire slip of the rear wheel is "large" allowing connection in any state of the tire's dynamic radius, all cases in which the tire's dynamic radius is such that "front wheel<rear wheel" are displayed as hatched, and connection is not possible. Thus, when the tire's dynamic radius is such that "front wheel<rear wheel", at least "F≈R", desirably "F<R", is enough.

By constructing the change gear ratio between the front and rear wheels so that the rear-wheel-side rotation speed R is larger than the front-wheel-side rotation speed F, smooth connection of the first disengaging mechanisms 20 and 220 can be achieved, except the state in which the tire slip of the front wheel with "F>>R" is "large" and the state in which the cornering radius is "small". For example, to allow smooth connection of the first disengaging mechanism 220 even when the rear wheel is larger than the front wheel by 3%, a gear ratio between the bevel gear 262 and the output pinion 264 on a front-wheel side is configured to be smaller by 3% or more than a gear ratio between the ring gear 278 and the drive pinion 276 on a rear-wheel side to set the rear-wheel-side rotation speed R at the time of connection larger by 3% or more than the front-wheel-side rotation speed F.

In FIG. 10B, to represent cuttable-off conditions of the first disengaging mechanisms 20 and 220, directions of the torque acting on the first disengaging mechanisms 20 and 220 (specifically, the coupling sleeve 116 of FIG. 2) at the time of cut-off are classified depending on the difference in running pattern and tire's dynamic radius, and are shown as conditions. As with FIG. 10A, in a torque direction table 408, as running patterns, magnitudes of the tire slip of the front wheel and the rear wheel are classified as "large", "small", and "none", and cornering radiuses are classified as "forward", "large", and "small". Also, magnitudes of tire's dynamic radiuses of the front wheel and the rear wheel are classified as states of "front wheel>rear wheel", "front wheel=rear wheel", and "front wheel<rear wheel". In each condition, the direction of the torque is represented as a coast torque C and a drive torque D, or a zero torque Z where no torque acts. Here, the coast torque C is a torque from left-rear wheels 100 and 200 and right-rear wheels 102 and 302 sides via the driving-force transmitting units 16 and 216, and the drive torque D is a torque from engines 28 and 228 side. Also, when each torque is further larger, that is represented as a coast torque CC or a drive torque DD. As described above, to allow cut-off of the first disengaging mechanisms 20 and 220 with a small force, it is a necessary condition that the direction of the torque acting on the first disengaging mechanisms 20 and 220 at the time of the start of cut-off be either one of the coast torque C and the zero torque Z. Therefore, in the torque direction table 408, portions of "D" and "DD" where this condition is not satisfied are displayed as hatched. According to the torque direction table 408, except the state in which the tire slip of the rear wheel is "large" allowing cut-off in any state of the tire's dynamic radius, all cases in which the tire's dynamic radius is such that "front wheel<rear wheel" are displayed as hatched, and cut-off is not possible. Thus, when the tire's dynamic radius is such that "front wheel<rear wheel", if the torque is at least "Z", desirably "C", the first disengaging mechanisms 20 and 220 can be cut off with a small force, except the state in which the tire slip of the front wheel with "DD" is "large" and the state in which the cornering radius is "small". Here, as evident from comparison between the rotation speed table 406 of FIG. 10A and the torque direction table 408 of FIG. 10B, when the direction of the torque acting on the first disengaging mechanisms 20 and 220 is "C", the front-wheel-side rotation speed F and the rear-wheel-side rotation speed R are such that "F<R".

Similarly, "D" corresponds to "F>R", and "Z" corresponds to "F≈R". Therefore, the conditions for cutting off the first disengaging mechanisms 20 and 220 are the same as those for connection.

Thus, when the tire's dynamic radius is such that "front wheel<rear wheel", at least "F'R", desirably "F<R", is enough. By constructing the change gear ratio between the front and rear wheels so that the rear-wheel-side rotation speed R is larger than the front-wheel-side rotation speed F, the first disengaging mechanisms 20 and 220 can be cut off with a small force, except the state in which the tire slip of the front wheel with "DD" is "large" and the state in which the cornering radius is "small".

Figure 11A:
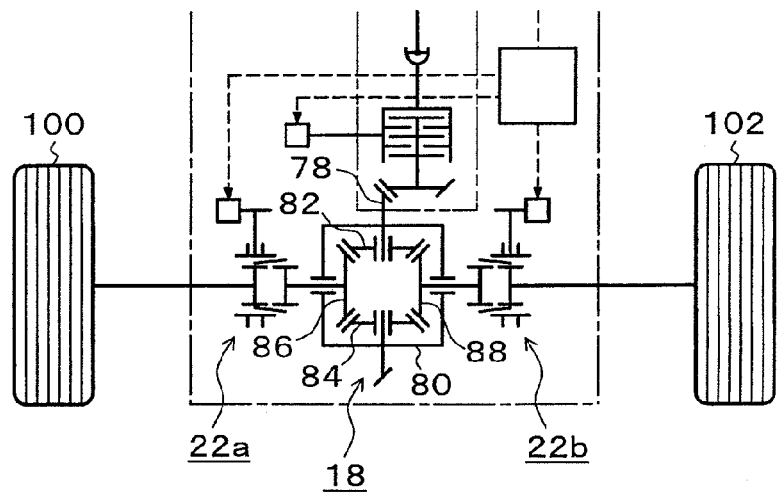
FIGS. 11A, 11B, and 11C are illustrative diagrams depicting other embodiments of the second disengaging mechanisms of FIG. 3 and FIG. 8.
Figure 11B:
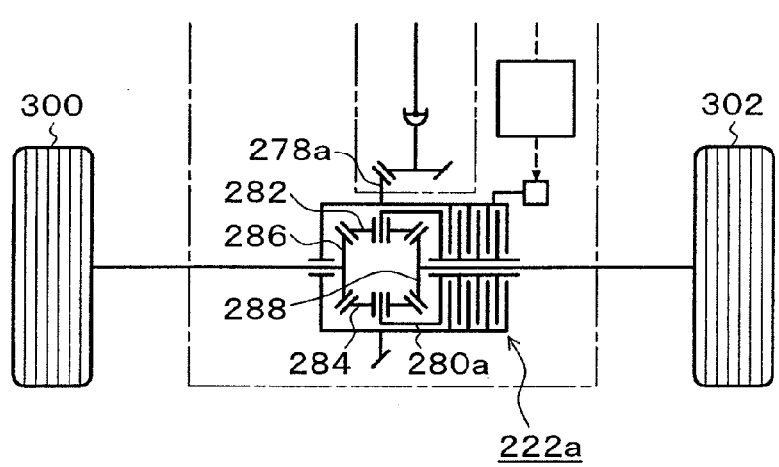
Figure 11C:
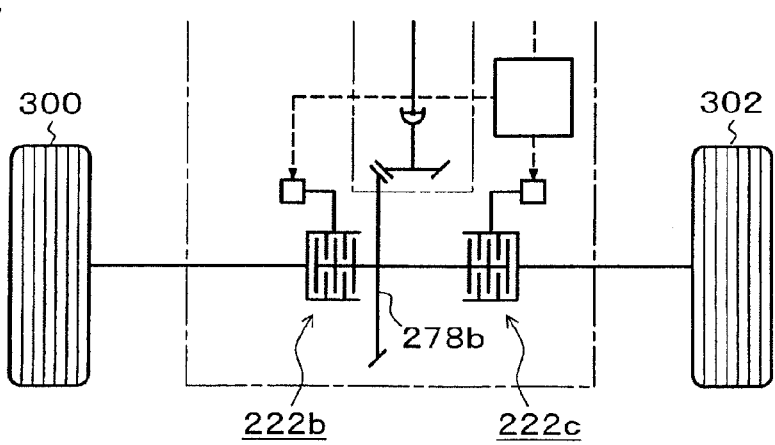

FIGS. 11A to 11C are illustrative diagrams depicting other embodiments of the second disengaging mechanisms of FIG. 3 and FIG. 8, and a front-wheel side including the first disengaging mechanism is omitted because it is identical to those in FIG. 3 and FIG. 8. Also, functions of the driving-force transmitting device in the two-wheel drive mode and the four-wheel drive mode and switching control from the two-wheel drive mode to the four-wheel drive mode and the four-wheel drive mode to the two-wheel drive mode are basically the same, except the structure of the second disengaging mechanism, and therefore only different portions are described.

In FIG. 11A, unlike the second disengaging mechanism 22 of FIG. 3 is placed only between the rear-wheel differential device 18 and the right-rear wheel 102, the device is provided on both sides of the rear-wheel differential device 18, that is, a second disengaging mechanism 22a is placed between the rear-wheel differential device 18 and the left-rear wheel 100 and a second disengaging mechanism 22b is placed between the rear-wheel differential device 18 and the right-rear wheel 102.

In FIG. 3, even when the second disengaging mechanism 22 is cut off and the ring gear 78 of the rear-wheel differential device 18 does not rotate in the two-wheel drive mode, with the rotation of the left-rear wheel 100, the components inside of the rear-wheel differential device 18, that is, the side gear 86, the pinions 82 and 84, and the side gear 88, rotate, and friction loss of this portion becomes a factor of causing a decrease in fuel efficiency. By contrast, in FIG. 11A, when the second disengaging mechanisms 22a and 22b are cut off in the two-wheel drive mode, the rotation of the left-rear wheel 100 and the right-rear wheel 102 is not transmitted to the rear-wheel differential device 18 at all. Therefore, all components of the rear-wheel differential device 18, that is, the ring gear 78, the differential case 80, the pinions 82 and 84, and the side gears 86 and 88 do not rotate. Therefore, it is possible to further prevent a decrease in fuel efficiency than the embodiment of FIG. 3.

In FIG. 11B, unlike the second disengaging mechanism 222 of FIG. 8 is placed between the rear-wheel differential device 218 and the right-rear wheel 302 of its outside, a second disengaging mechanism 222a is placed between a ring gear 278a and the differential case 280a inside the rear-wheel differential device 18.

In FIG. 8, as with FIG. 3, even when the second disengaging mechanism 222 is cut off and the ring gear 278 of the rear-wheel differential device 218 does not rotate in the two-wheel drive mode, with the rotation of the left-rear wheel 300, the components inside of the rear-wheel differential device 218, that is, the side gear 286, the pinions 282 and 284, and the side gear 288, rotate, and friction loss of this portion becomes a factor of causing a decrease in fuel efficiency. By contrast, in FIG. 11B, when the second disengaging mechanism 222a is cut off in the two-wheel drive mode, the rotation speeds of the left-rear wheel 100 and the rotation speed of the right-rear wheel 102 are equal, the pinions 282 and 284 do not rotate, and only the differential case 280a rotates. Therefore, the embodiment of FIG. 11B can further prevent a decrease in fuel efficiency than the embodiment of FIG. 8.

In FIG. 11C, unlike the second disengaging device 222 of FIG. 8 is placed only on a right-rear wheel 302 side, the device is placed on both sides of a ring gear 278b, that is, a second disengaging mechanism 222b is placed on a left-rear wheel 300 side, and a second disengaging mechanism 222c is placed on a right-rear wheel 302 side. With possible omission of the rear-wheel differential device 218, the shaft of the ring gear 278b is directly connected to the second disengaging mechanisms 222b and 222c.

Even when a difference in rotation speed occurs between the left-rear wheel 300 and the right-rear wheel 302, the difference in rotation speed can be absorbed by appropriately controlling the second disengaging devices 222b and 222c. When the second disengaging mechanisms 222b and 222c are cut off in the two-wheel drive mode, the rotation of the left-rear wheel 300 and the right-rear wheel 302 is not transmitted to the ring gear 278 at all. Therefore, it is possible further prevent a decrease in fuel efficiency than the embodiment of FIG. 8.

Figure 12:
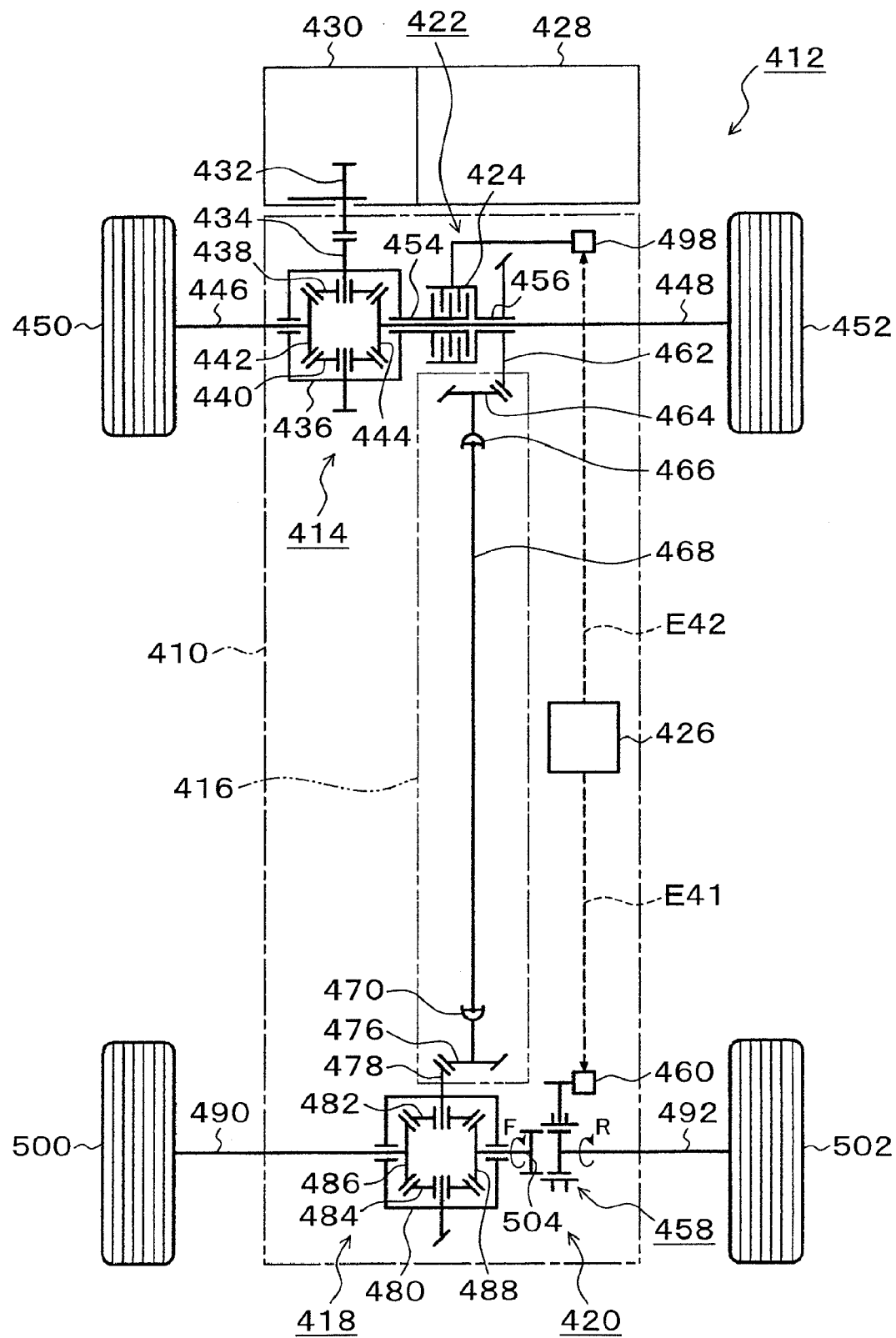
FIG. 12 is an illustrative diagram depicting a third embodiment of the driving-force transmitting apparatus for a four-wheel-drive vehicle according to the present invention.

FIG. 12 is an illustrative diagram depicting a third embodiment of the driving-force transmitting apparatus for a four-wheel-drive vehicle according to the present invention, where the apparatus is applied to an FF-vehicle-base four-wheel-drive vehicle. The present embodiment is substantially identical in structure to the second embodiment depicted in FIG. 8, except that the first disengaging mechanism and the second disengaging mechanism are disposed with their positions being changed. In FIG. 12, a driving-force transmitting apparatus 410 of the present embodiment is provided to a four-wheel-drive vehicle 412, and includes a front-wheel differential device 414, a driving-force transmitting unit 416, and a rear-wheel differential device 418. Also, a second disengaging mechanism 422 is provided between the front-wheel differential device 414 and the driving-force transmitting unit 416, and a first disengaging mechanism 420 is provided between the rear-wheel differential device 418 and a right-rear wheel 502. To the first disengaging mechanism 420 and the second disengaging mechanism 422 of the driving-force transmitting apparatus 410, control signals E41 and E42 are given from an ECU 426. After the speed of a driving force from an engine 428 is changed by a change gear 430, the driving force is input from a drive gear 432 of the change gear 430 to the front-wheel differential device 414. The front-wheel differential device 414 transmits the driving force from the change gear 430 to a left-front wheel 450 and a right-front wheel 452. The front-wheel differential device 414 is configured of a ring gear 434 engaging with the drive gear 432, a differential case 436 having the ring gear 434 fixed thereto, pinions 438 and 440 rotatably and axially supported inside of the differential case 436, and side gears 442 and 444 engaging with the pinions 438 and 440. A driving force from the drive gear 432 is received by the ring gear 434 to drive a left-front-wheel driving shaft 446 and a right-front-wheel driving shaft 448 via the pinions 438 and 440 and the side gears 442 and 444 and rotate the left-front wheel 450 and the right-front wheel 452. With this, the driving force is transmitted onto a road surface.

When a difference in rotation speed occurs between the left-front wheel 450 and the right-front wheel 452 at the time of cornering or due to a change of a road surface state or the like, the front-wheel differential device 414 absorbs the rotation speed to provide the same torque to the left-front wheel 450 and the right-front wheel 452 for rotation. The driving force from the drive gear 432 is input also to the second disengaging mechanism 422 via the ring gear 434 and the differential case 436 of the front-wheel differential device 414. In the two-wheel drive mode, the second disengaging mechanism 422 is in a state of disengaging the driving-force transmitting unit 416 by an operation with the control signal E42 from the ECU 426 and cutting off the driving force to a rear-wheel side.

Therefore, in the two-wheel drive mode, the driving force from the engine 428 is not transmitted to a rear-wheel side via the driving-force transmitting unit 416. On the other hand, in the four-wheel drive mode, the second disengaging mechanism 422 is in a state of being connected to the driving-force transmitting unit 416 by an operation with the control signal E42 from the ECU 426. Therefore, the driving force input to a differential case shaft 454 integrally formed on the differential case 436 is transmitted to a bevel gear shaft 456, and the transmitting direction is converted by a bevel gear 462 and an output pinion 464 fixed to the bevel gear shaft 456 for output. The driving force output from the output pinion 464 is transmitted to a drive pinion 476 via a universal joint 466, a propeller shaft 468, and a universal joint 470, and the direction is converted and transmitted from the drive pinion 476 to the ring gear 478 of the rear-wheel differential device 418. The rear-wheel differential device 418 is configured of a ring gear 478 engaging with the drive pinion 476, a differential case 480 having the ring gear 478 fixed thereto, pinions 482 and 484 rotatably and axially supported inside of the differential case 480, and side gears 486 and 488 engaging with the pinions 482 and 484. Via a left-rear-wheel driving shaft 490 jointed to the side gear 486 and the first disengaging mechanism 420 and a right-rear-wheel driving shaft 492 jointed to the side gear 488, a left-rear wheel 500 and the right-rear wheel 502 are rotated to cause the driving force to be transmitted onto the road surface. In the present embodiment, a multi-plate clutch mechanism 424 is used as the second disengaging mechanism 422. The multi-plate clutch mechanism 424 is provided at some point between the front-wheel differential device 414 and the bevel gear 462 to disengage the driving force to the left-rear wheel 500 and the right-rear wheel 502. In the two-wheel drive mode, the multi-plate clutch mechanism 424 operates an actuator 498 with the control signal E42 from the ECU 426, and is controlled to be in a released state in which no driving force is transmitted, disengaging transmission of the driving force between the front-wheel differential device 414 and the bevel gear 462. In the four-wheel drive mode, the multi-plate clutch mechanism 424 operates the actuator 498 with the control signal E42 from the ECU 426 according to a signal from a vehicle-state detection sensor (not shown), and is optimally controlled between a released state in which no driving force is transmitted (two-wheel drive state) and a directly-connected state in which a maximum driving force is transmitted, thereby transmitting the driving force from the engine 428 to the left-rear wheel 500 and the right-rear wheel 502 via the driving-force transmitting unit 416 and the rear-wheel differential device 418. That is, in the four-wheel drive mode, the rear-wheel differential device 418 effectively operates. Even when a difference in rotation speed occurs between the left-rear wheel 500 and the right-rear wheel 502 at the time of cornering or due to a change of a road surface state or the like, the rear-wheel differential device 418 can absorb the difference in rotation speed to provide the same torque to the left-rear wheel 500 and the right-rear wheel 502 for rotation. In the present embodiment, an engaging clutch mechanism 458 is used as the first disengaging mechanism 420. With a shift operation by the actuator 460, switching is made between a cut-off state as the two-wheel drive mode and a connected state as the four-wheel drive mode. Since the first disengaging mechanism 420 is substantially identical to the first disengaging mechanism 20 of the first embodiment, detailed description is omitted (refer to FIG. 2). Here, functions of the driving-force transmitting apparatus 410 in the two-wheel drive mode and the four-wheel drive mode of the third embodiment are described with reference to FIG. 12. In the two-wheel drive mode, with the control signal E42 of the ECU 426, the second disengaging mechanism 422 is cut off. Therefore, the driving force from the change gear 430 is transmitted to the differential case shaft 454 via the ring gear 434 and the differential case 436 of the front-wheel differential device 414. However, since the second disengaging mechanism 422 is in a cut-off state, the driving force is not output to the bevel gear shaft 456. On the other hand, since the first disengaging mechanism 420 is also cut off with the control signal E41 from the ECU 426, even if the left-rear wheel 500 and the right-rear wheel 502 are rotating, the ring gear 478 of the rear-wheel differential device 418 does not rotate. With this, in the two-wheel drive mode, the rotation of the driving-force transmitting unit 416 including the bevel gear 462, the output pinion 464, the universal joint 466, the propeller shaft 468, the universal joint 470, the drive pinion 476, and the ring gear 478 of the rear-wheel differential device 418 stops, thereby solving the problem of decreasing fuel efficiency due to friction loss caused by the fact that the driving-force transmitting unit 416 rotates in two-wheel drive.

In the four-wheel drive mode, with the second disengaging mechanism 422 being connected and coupled, the driving force from the change gear 430 rotates the bevel gear 462 from the ring gear 434 and the differential case 436 of the front-wheel differential device 414 via the second disengaging mechanism 422 in a connected state. After the direction is converted at the output pinion 464, the driving force is input to the ring gear 478 of the rear-wheel differential device 418 via the universal joint 466, the propeller shaft 468, the universal joint 470, and the drive pinion 476. With the first disengaging mechanism 420 being connected, the rear-wheel differential device 418 effectively operates. Via the rear-wheel differential device 418, the driving force can be transmitted to the left-rear wheel 500 and the right-rear wheel 502 for rotation. As a matter of course, in either of the two-wheel drive mode and the four-wheel drive mode, the driving force from the drive gear 432 of the change gear 430 is transmitted to the left-front-wheel driving shaft 446 and the right-front-wheel driving shaft 448 via the front-wheel differential device 414 to allow the left-front wheel 450 and the right-front wheel 452 to rotate. Next, switching control from the two-wheel drive mode to the four-wheel drive mode and the four-wheel drive mode to the two-wheel drive mode in the third embodiment is described with reference to FIG. 12. In the two-wheel drive mode, since the second disengaging mechanism 422 is cut off, the driving force from the engine 428 is not transmitted to the rear-wheel differential device 418. Since the first disengaging mechanism 420 is also cutoff, the rear-wheel differential device 418 is driven by the left-rear wheel 500, and the side gear 488 is idled via the pinions 482 and 484 in a direction reverse to that of the side gear 486. In switching from the two-wheel drive mode to the four-wheel drive mode, the actuator 498 is first operated with the control signal E42 of the ECU 426 to start coupling of the multi-plate clutch mechanism 424, thereby starting synchronization of the second disengaging mechanism 422, that is, synchronization between the rotating differential case shaft 454 and the stopped bevel gear shaft 456. Next, when the second disengaging mechanism 442 starts synchronization, the rotation of the differential case shaft 454 is transmitted from the bevel gear 462 to the output pinion 464 to rotate the universal joint 466, the propeller shaft 468, the universal joint 470, the drive pinion 476, and the ring gear 478. That is, with the start of synchronization of the second disengaging mechanism 422, the rotation speed of the driving-force transmitting unit 416 increases, the rotating direction of the side gear 488 of the rear-wheel differential device 418 is reversed to the same direction of the side gear 486 to increase the rotation speed, and the difference in rotation speed between a side gear shaft 504 and the right-rear-wheel driving shaft 492 starts decreasing. Here, the driving-force transmitting unit 416 configures a change gear ratio between the front and rear wheels so that the side gear shaft 504 of the first disengaging mechanism 420 rotates at a speed higher than that of the right-rear-wheel driving shaft 492 at the completion of synchronization of the second disengaging mechanism 422, with the first disengaging mechanism 420 being in a cut-off state. Therefore, upon completion of synchronization of the second disengaging mechanism 422, the rotation speed of the side gear shaft 504 becomes above the rotation speed of the opposing right-rear-wheel driving shaft 492, thereby reversing the direction of the difference in rotation speed. In this manner, with the change gear ratio between the front and rear wheels being configured to control the first disengaging mechanism 420 and the second disengaging mechanism 422, it is infallibly possible to bring about a state in which there is no difference in rotation speed between the side gear shaft 504 and the right-rear-wheel driving shaft 492, which are input and output shafts of the engaging clutch mechanism 458, that is, a state in which the engaging clutch mechanism 458 can be quickly and reliably connected with a small force. Therefore, between the start and completion of synchronization of this second disengaging mechanism 422, when the rotation speed of the side gear shaft 504 matches the rotation speed of the opposing right-rear-wheel driving shaft 492 or when the difference in rotation speed is within a predetermined range, the actuator 460 is operated with the control signal E41 of the ECU 426 to connect the first disengaging mechanism 420.

After the first disengaging mechanism 420 is connected, when synchronization is completed and the second disengaging mechanism 422 is also connected, the driving force from the engine 428 is transmitted also to the left-rear wheel 500 and the right-rear wheel 502 via the driving-force transmitting unit 416 and the rear-wheel differential device 418, thereby bringing about the four-wheel drive mode in which the ECU 426 controls the transmission torque of the multi-plate clutch mechanism 424 according to the running state.

In switching from the four-wheel drive mode to the two-wheel drive mode, the engine 428 and the second disengaging mechanism 422 are first controlled by the ECU 426 to cause a drive torque (a torque from an engine 428 side via the driving-force transmitting unit) to act on the first disengaging mechanism 420, and then the actuator 460 is operated with the control signal E41 of the ECU 426 to cause the first disengaging mechanism 420 to be in a cut-off wait state, as with FIG. 2 of the first embodiment. Next, with the control signal E42 of the ECU 426, the actuator 498 is operated to start cutting off the second disengaging mechanism 422. Then, when the direction of the torque acting on the first disengaging mechanism 420 is transformed, that is, when the drive torque is transformed to a coast torque (a torque from a right-rear wheel 502 side), at a timing when the torque becomes zero, the first disengaging mechanism 420 is cut off. After the first disengaging mechanism 420 is cut off, when the second disengaging mechanism 422 also becomes in a cut-off state, the driving force from the engine 428 and the driving force from the left-rear wheel 500 and the right-rear wheel 502 are not transmitted to the driving-force transmitting unit 416, and the driving-force transmitting unit 416 does not rotate. Therefore, the state becomes in the two-wheel drive mode of preventing a decrease in fuel efficiency due to friction loss.

FIGS. 13A and 13B are illustrative diagrams depicting disengageable conditions of the first disengaging mechanism 420 of FIG. 12, representing, as a list, a relation between various running states of a four-wheel-drive vehicle and the difference in tire's dynamic radius between the front and rear wheels when the structure is as depicted in FIG. 10 but there is no difference provided to the conventional change gear ratio between the front and rear wheels.

In FIG. 13A, to represent connectable conditions of the first disengaging mechanism 420, magnitudes of a front-wheel-side rotation speed F and a rear-wheel-side rotation speed R at the time of connection are classified depending on the running pattern and the difference in tire's dynamic radius, and are shown as conditions. Here, the front-wheel-side rotation speed F indicates the rotation speed of the side gear shaft 504, and the rear-wheel-side rotation speed R indicates the rotation speed of the right-rear-wheel driving shaft 492. In a rotation speed table 506, as running patterns, magnitudes of the tire slip of the front wheel and the rear wheel are classified as "large", "small", and "none", and cornering radiuses are classified as "forward", "large", and "small". Also, as tire's dynamic radiuses, magnitudes of the front wheel and the rear wheel are classified as states of "front wheel>rear wheel", "front wheel=rear wheel", and "front wheel<rear wheel".

In each condition, a relation in magnitude of the front-wheel-side rotation speed F and the rear-wheel-side rotation speed R is represented as ">", ">>", "<", or "<<", and when both rotation speeds can be regarded as equal, "≈" is used for representation. As described above, for allowing smooth connection of the first disengaging mechanism 420, it is a necessary condition that the front-wheel-side rotation speed F (driving-force transmitting unit side) is larger than the rear-wheel-side rotation speed R (opposing side) at the start of connection. Therefore, in the rotation speed table 506, portions of "F<R" and "F<<R" where this condition is not satisfied are displayed as hatched. According to the rotation speed table 506, except the state in which the tire slip of the front wheel is "large" allowing connection in any state of the tire's dynamic radius and the state of the cornering radius "small", all cases in which the tire's dynamic radius is such that "front wheel>rear wheel" are displayed as hatched, and connection is not possible. Thus, when the tire's dynamic radius is such that "front wheel>rear wheel", at least "F≈R", desirably "F>R", is enough. By constructing the change gear ratio between the front and rear wheels so that the front-wheel-side rotation speed F is larger than the rear-wheel-side rotation speed R, smooth connection of the first disengaging mechanism 420 can be achieved, except the state in which the tire slip of the rear wheel with "F<<R" is "large". For example, to allow smooth connection of the first disengaging mechanism 420 even when the front wheel is larger than the rear wheel by 3%, a gear ratio between the ring gear 478 and the drive pinion 476 on a rear-wheel side is configured to be smaller by 3% or more than a gear ratio between the bevel gear 462 and the output pinion 464 on a front-wheel side to set the front-wheel-side rotation speed F at the time of connection larger by 3% or more than the rear-wheel-side rotation speed R.

In FIG. 13B, to represent cuttable-off conditions of the first disengaging mechanism 420, directions of the torque acting on the first disengaging mechanism 420 at the time of cut-off are classified depending on the difference in running pattern and tire's dynamic radius, and are shown as conditions. As with FIG. 13A, in a torque direction table 508, as running patterns, magnitudes of the tire slip of the front wheel and the rear wheel are classified as "large", "small", and "none", and cornering radiuses are classified as "forward", "large", and "small". Also, magnitudes of tire's dynamic radiuses of the front wheel and the rear wheel are classified as states of "front wheel>rear wheel", "front wheel=rear wheel", and "front wheel<rear wheel". In each condition, the direction of the torque is represented as a coast torque C and a drive torque D, or a zero torque Z where no torque acts. Here, the coast torque C is a torque from the right-rear wheel 502, and the drive torque D is a torque from an engine 428 side via the driving-force transmitting unit 416.

Also, when each torque is further larger, that is represented as a coast torque CC or a drive torque DD. As described above, to allow cut-off of the first disengaging mechanism 420 with a small force, it is a necessary condition that the direction of the torque acting on the first disengaging mechanism 420 at the time of the start of cut-off be either one of the coast torque D and the zero torque Z.

Therefore, in the torque direction table 508, portions of "C" and "CC" where this condition is not satisfied are displayed as hatched. According to the torque direction table

508, except the state in which the tire slip of the front wheel is "large" allowing cut-off in any state of the tire's dynamic radius and the state of the cornering radius "small", all cases in which the tire's dynamic radius is such that "front wheel>rear wheel" are displayed as hatched, and cut-off is not possible. Thus, when the tire's dynamic radius is such that "front wheel>rear wheel", if the torque is at least "Z", desirably "D", the first disengaging mechanism 420 can be cut off with a small force, except the state in which the tire slip of the rear wheel with "CC" is "large". Here, as evident from comparison between the rotation speed table 506 of FIG. 13A and the torque direction table 508 of FIG. 13B, when the direction of the torque acting on the first disengaging mechanism 420 is "D", the front-wheel-side rotation speed F and the rear-wheel-side rotation speed R are such that "F>R".

Similarly, "C" corresponds to "F<R", and "Z" corresponds to "F≈R". Therefore, the conditions for cutting off the first disengaging mechanism 420 are the same as those for connection. Thus, when the tire's dynamic radius is such that "front wheel>rear wheel", at least "FR", desirably "F>R", is enough. By constructing the change gear ratio between the front and rear wheels so that the front-wheel-side rotation speed F is larger than the rear-wheel-side rotation speed R, the first disengaging mechanism 420 can be cut off with a small force, except the state in which the tire slip of the rear wheel with "CC" is "large".

Figure 14:
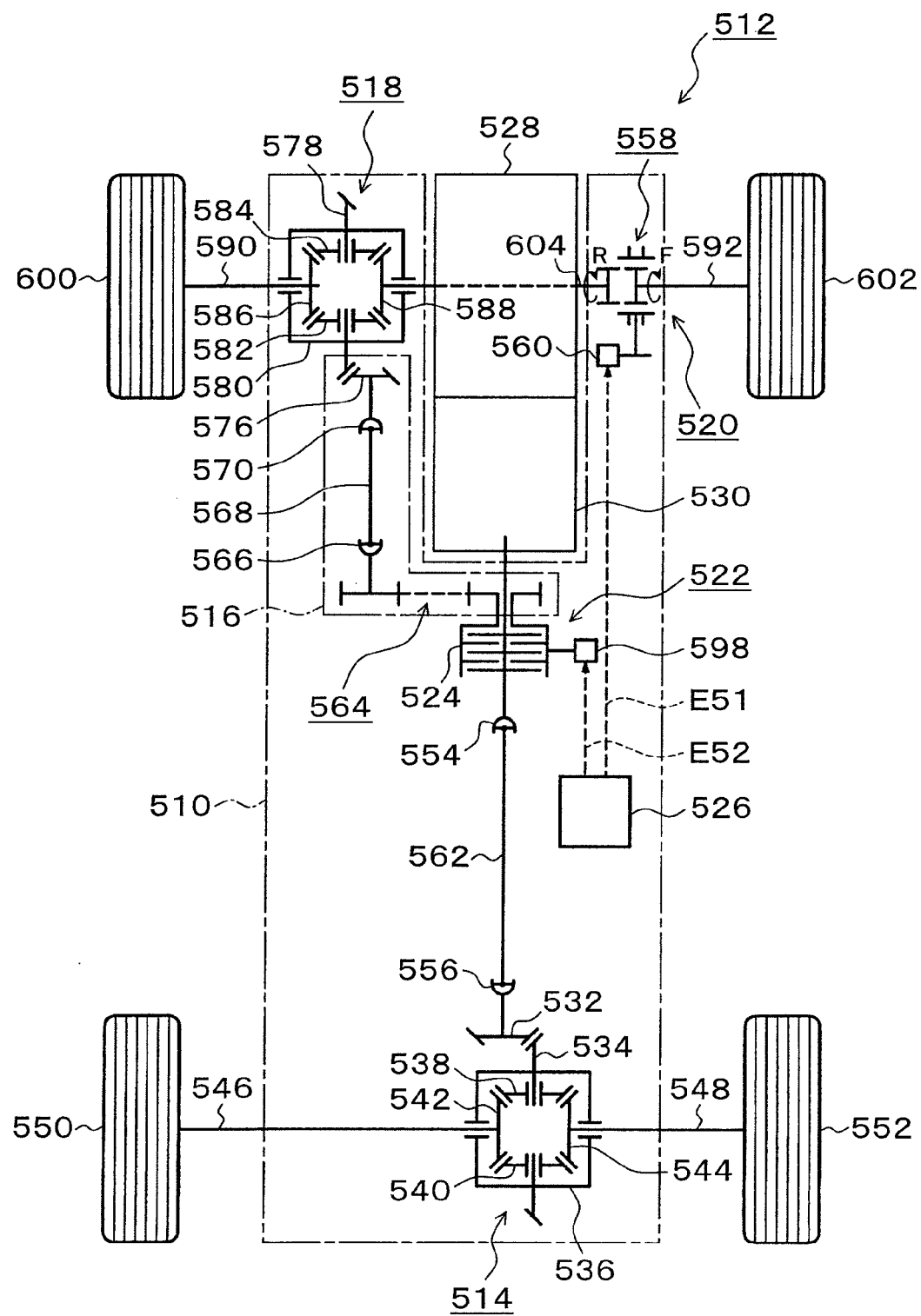
FIG. 14 is an illustrative diagram depicting a fourth embodiment of the driving-force transmitting apparatus for a four-wheel-drive vehicle according to the present invention.

FIG. 14 is an illustrative diagram depicting a fourth embodiment of the driving-force transmitting apparatus for a four-wheel-drive vehicle according to the present invention, where the apparatus is applied to an FR-vehicle-base four-wheel-drive vehicle. In FIG. 14, a driving-force transmitting apparatus 510 of the present embodiment is provided to a four-wheel-drive vehicle 512, and includes a rear-wheel differential device 514, a driving-force transmitting unit 516, and a front-wheel differential device 518. Also, a second disengaging mechanism 522 is provided between a change gear 530 and the driving-force transmitting unit 516, and a first disengaging mechanism 520 is provided between the front-wheel differential device 518 and a right-front wheel 602. To the first disengaging mechanism 520 and the second disengaging mechanism 522 of the driving-force transmitting apparatus 510, control signals E51 and E52 are given from an ECU 526. After the speed of a driving force from an engine 528 is changed by the change gear 530, the driving force is input to the second disengaging mechanism 522. The second disengaging mechanism 522 transmits the driving force from the change gear 530 to the rear-wheel differential device 514. The rear-wheel differential device 514 is configured of a ring gear 534 engaging with a drive pinion 532, a differential case 536 having the ring gear 534 fixed thereto, pinions 538 and 540 rotatably and axially supported inside of the differential case 536, and side gears 542 and 544 engaging with the pinions 538 and 540. A driving force from the drive pinion 532 is received by the ring gear 534 to drive a left-rear-wheel driving shaft 546 and a right-rear-wheel driving shaft 548 via the pinions 538 and 540 and the side gears 542 and 544 and rotate a left-rear wheel 550 and a right-rear wheel 552.

With this, the driving force is transmitted onto a road surface. When a difference in rotation speed occurs between the left-rear wheel 550 and the right-rear wheel 552 at the time of cornering or due to a change of a road surface state or the like, the rear-wheel differential device 514 absorbs the rotation speed to provide the same torque to the left-rear wheel 550 and the right-rear wheel 552 for rotation. In the two-wheel drive mode, the second disengaging mechanism 522 is in a state of disengaging the driving-force transmitting unit 516 by an operation with the control signal E52 from the ECU 526 and cutting off the driving force to a front-wheel side. Therefore, in the two-wheel drive mode, the driving force from the engine 528 is not transmitted to a front-wheel side via the driving-force transmitting unit 516. On the other hand, in the four-wheel drive mode, the second disengaging mechanism 522 is in a state of being connected to the driving-force transmitting unit 516 by an operation with the control signal E52 from the ECU 526. Therefore, the transmitting direction is converted by a chain belt mechanism 564 for output. The driving force output from the chain belt mechanism 564 is transmitted to a drive pinion 576 via a universal joint 566, a propeller shaft 568, and a universal joint 570, and the direction is converted and transmitted from the drive pinion 576 to a ring gear 578 of the front-wheel differential device 518. The front-wheel differential device 518 is configured of the ring gear 578 engaging with the drive pinion 576, a differential case 580 having the ring gear 578 fixed thereto, pinions 582 and 584 rotatably and axially supported inside of the differential case 580, and side gears 586 and 588 engaging with the pinions 582 and 584. Via a left-front-wheel driving shaft 590 jointed to the side gear 586 and the first disengaging mechanism 520 and a right-front-wheel driving shaft 592 jointed to the side gear 588, a left-front wheel 600 and the right-front wheel 602 are rotated to cause the driving force to be transmitted onto the road surface. In the present embodiment, a multi-plate clutch mechanism 524 is used as the second disengaging mechanism 522. The multi-plate clutch mechanism 524 is provided at some point between the change gear 530 and the rear-wheel differential device 514 to disengage the driving force to the left-front wheel 600 and the right-front wheel 602. In the two-wheel drive mode, the multi-plate clutch mechanism 524 operates an actuator 598 with the control signal E52 from the ECU 526, and is controlled to be in a released state in which no driving force is transmitted, disengaging transmission of the driving force between the change gear 530 and the chain belt mechanism 564. In the four-wheel drive mode, the multi-plate clutch mechanism 524 operates the actuator 598 with the control signal E52 from the ECU 526 according to a signal from a vehicle-state detection sensor (not shown), and is optimally controlled between a released state in which no driving force is transmitted (two-wheel drive state) and a directly-connected state in which a maximum driving force is transmitted, thereby transmitting the driving force from the engine 528 to the left-front wheel 600 and the right-front wheel 602 via the driving-force transmitting unit 516 and the front-wheel differential device 518. That is, in the four-wheel drive mode, the front-wheel differential device 518 effectively operates. Even when a difference in rotation speed occurs between the left-front wheel 600 and the right-front wheel 602 at the time of cornering or due to a change of a road surface state or the like, the front-wheel differential device 518 can absorb the difference in rotation speed to provide the same torque to the left-front wheel 600 and the right-front wheel 602 for rotation. In the present embodiment, an engaging clutch mechanism 558 is used as the first disengaging mechanism 520. With a shift operation by an actuator 560, switching is made between a cut-off state as the two-wheel drive mode and a connected state as the four-wheel drive mode. Since the first disengaging mechanism 520 is substantially identical to the first disengaging mechanism 20 of the first embodiment, detailed description is omitted (refer to FIG. 2). Here, functions of the driving-force transmitting apparatus 510 in the two-wheel drive mode and the four-wheel drive mode of the fourth embodiment are described with reference to FIG. 14. In the two-wheel drive mode, with the control signal E52 of the ECU 526, the second disengaging mechanism 522 is cut off. Therefore, the driving force from the change gear 530 is not output to the chain belt mechanism 564. On the other hand, since the first disengaging mechanism 520 is also cut off with the control signal E51 from the ECU 526, even if the left-front wheel 600 and the right-front wheel 602 are rotating, the ring gear 578 of the front-wheel differential device 518 does not rotate. With this, in the two-wheel drive mode, the rotation of the driving-force transmitting unit 516 including the chain belt mechanism 564, the universal joint 566, the propeller shaft 568, the universal joint 570, the drive pinion 576, and the ring gear 578 of the front-wheel differential device 518 stops, thereby solving the problem of decreasing fuel efficiency due to friction loss caused by the fact that the driving-force transmitting unit 516 rotates in two-wheel drive.

In the four-wheel drive mode, with the second disengaging mechanism 522 being connected, after the direction is converted at the chain belt mechanism 564 via the second disengaging mechanism 522, the driving force from the change gear 530 is input to the ring gear 578 of the front-wheel differential device 518 via the universal joint 566, the propeller shaft 568, the universal joint 570, and the drive pinion 576. With the first disengaging mechanism 520 being connected, the front-wheel differential device 518 effectively operates. Via the front-wheel differential device 518, the driving force can be transmitted to the left-front wheel 600 and the right-front wheel 602 for rotation. As a matter of course, in either of the two-wheel drive mode and the four-wheel drive mode, the driving force from the change gear 530 is transmitted to the left-rear-wheel driving shaft 546 and the right-rear-wheel driving shaft 548 via the rear-wheel differential device 514 to allow the left-rear wheel 550 and the right-rear wheel 552 to rotate. Next, switching control from the two-wheel drive mode to the four-wheel drive mode and the four-wheel drive mode to the two-wheel drive mode in the fourth embodiment is described with reference to FIG. 14. In the two-wheel drive mode, since the second disengaging mechanism 522 is cut off, the driving force from the engine 528 is not transmitted to the front-wheel differential device 518. Since the first disengaging mechanism 520 is also cut off, the front-wheel differential device 518 is driven by the left-front wheel 600, and the side gear 588 is idled via the pinions 582 and 584 in a direction reverse to that of the side gear 586. In switching from the two-wheel drive mode to the four-wheel drive mode, the actuator 598 is first operated with the control signal E52 of the ECU 526 to start coupling of the multi-plate clutch mechanism 524, thereby starting synchronization of the second disengaging mechanism 522, that is, synchronization between a rotating hub side (rear-wheel side) and a stopped drum side (front-wheel side) of the multi-plate clutch mechanism 524. When the second disengaging mechanism 522 starts synchronization, the driving force from the change gear 530 is transmitted to the chain belt mechanism 564 to rotate the universal joint 566, the propeller shaft 568, the universal joint 570, the drive pinion 576, and the bevel gear 578. That is, with the start of synchronization of the second disengaging mechanism 522, the rotation speed of the driving-force transmitting unit 516 increases, the rotating direction of the side gear 588 of the front-wheel differential device 518 is reversed to the same direction of the side gear 586 to increase the rotation speed, and the difference in rotation speed between a side gear shaft 604 and the right-front-wheel driving shaft 592 starts decreasing. Here, the driving-force transmitting unit 516 configures a change gear ratio between the front and rear wheels so that the side gear shaft 604 of the first disengaging mechanism 520 rotates at a speed higher than that of the right-front-wheel driving shaft 592 at the completion of synchronization of the second disengaging mechanism 522, with the first disengaging mechanism 520 being in a cut-off state.

Therefore, upon completion of synchronization of the second disengaging mechanism 522, the rotation speed of the side gear shaft 604 becomes above the rotation speed of the opposing right-front-wheel driving shaft 592, thereby reversing the direction of the difference in rotation speed. In this manner, with the change gear ratio between the front and rear wheels being configured to control the first disengaging mechanism 520 and the second disengaging mechanism 522, it is infallibly possible to bring about a state in which there is no difference in rotation speed between the side gear shaft 604 and the right-front-wheel driving shaft 592, which are input and output shafts of the engaging clutch mechanism 558, that is, a state in which the engaging clutch mechanism 558 can be quickly and reliably connected with a small force. Therefore, between the start and completion of synchronization of this second disengaging mechanism 522, when the rotation speed of the side gear shaft 604 matches the rotation speed of the opposing right-front-wheel driving shaft 592 or when the difference in rotation speed is within a predetermined range, the actuator 560 is operated with the control signal E51 of the ECU 526 to connect the first disengaging mechanism 520.

After the first disengaging mechanism 520 is connected, when synchronization is completed and the second disengaging mechanism 522 is also connected, the driving force from the engine 528 is transmitted also to the left-front wheel 600 and the right-front wheel 602 via the driving-force transmitting unit 516 and the front-wheel differential device 518, thereby bringing about the four-wheel drive mode in which the ECU 526 controls the transmission torque of the multi-plate clutch mechanism 524 according to the running state.

In switching from the four-wheel drive mode to the two-wheel drive mode, the engine 528 and the second disengaging mechanism 522 are first controlled by the ECU 526 to cause a drive torque (a torque from an engine 528 side via the driving-force transmitting unit 516) to act on the first disengaging mechanism 520, and then the actuator 560 is operated with the control signal E51 of the ECU 526 to cause the first disengaging mechanism 520 to be in a cut-off wait state, as with FIG. 4 of the first embodiment. Next, with the control signal E52 of the ECU 526, the actuator 598 is operated to start cutting off the second disengaging mechanism 522. Then, when the direction of the torque acting on the first disengaging mechanism 520 is transformed, that is, when the drive torque is transformed to a coast torque (a torque from a right-front wheel 602 side), at a timing when the torque becomes zero, the first disengaging mechanism 520 is cut off. After the first disengaging mechanism 520 is cut off, when the second disengaging mechanism 522 also becomes in a cut-off state, the driving force from the engine 528 and the driving force from the left-front wheel 600 and the right-front wheel 602 are not transmitted to the driving-force transmitting unit 516, and the driving-force transmitting unit 516 does not rotate. Therefore, the state becomes in the two-wheel drive mode of preventing a decrease in fuel efficiency due to friction loss.

FIGS. 15A and 15B are illustrative diagrams depicting disengageable conditions of the first disengaging mechanism 520 of FIG. 14, representing, as a list, a relation between various running states of a four-wheel-drive vehicle and the difference in tire's dynamic radius between the front and rear wheels when there is no difference provided to the conventional change gear ratio between the front and rear wheels.

In FIG. 15A, to represent disengageable conditions of the first disengaging mechanism 520, magnitudes of a frontwheel-side rotation speed F and a rear-wheel-side rotation speed R at the time of connection are classified depending on the running pattern and the difference in tire's dynamic radius, and are shown as conditions. Here, as depicted in FIG. 12, the front-wheel-side rotation speed F indicates the rotation speed of the right-front-wheel driving shaft 592, and the rear-wheel-side rotation speed R indicates the rotation speed of the side gear shaft 604. In a rotation speed table 606, as running patterns, magnitudes of the tire slip of the front wheel and the rear wheel are classified as "large", "small", and "none", and cornering radiuses are classified as "forward", "large", and "small". Also, as tire's dynamic radiuses, magnitudes of the front wheel and the rear wheel are classified as states of "front wheel>rear wheel", "front wheel=rear wheel", and "front wheel<rear wheel". In each condition, a relation in magnitude of the front-wheel-side rotation speed F and the rear-wheel-side rotation speed R is represented as ">", ">>", "<", or "<<", and when both rotation speeds can be regarded as equal, "≈" is used for representation. As described above, for allowing smooth connection of the first disengaging mechanism 520, it is a necessary condition that the rear-wheel-side rotation speed R (driving-force transmitting unit side) is larger than the front-wheel-side rotation speed F (opposing side) at the start of connection. Therefore, in the rotation speed table 606, portions of "F>R" and "F>>R" where this condition is not satisfied are displayed as hatched. According to the rotation speed table 606, except the state in which the tire slip of the rear wheel is "large" allowing connection in any state of the tire's dynamic radius, all cases in which the tire's dynamic radius is such that "front wheel<rear wheel" are displayed as hatched, and connection is not possible. Thus, when the tire's dynamic radius is such that "front wheel<rear wheel", at least "F≈R", desirably "F<R", is enough.

By constructing the change gear ratio between the front and rear wheels so that the rear-wheel-side rotation speed R is larger than the front-wheel-side rotation speed F, smooth connection of the first disengaging mechanism 520 can be achieved, except the state in which the tire slip of the front wheel with "F>>R" is "large" and the state in which the cornering radius is "small". For example, to allow smooth connection of the first disengaging mechanism 520 even when the rear wheel is larger than the front wheel by 3%, a gear ratio between the ring gear 578 and the output pinion 576 on a front-wheel side is configured to be smaller by 3% or more than a gear ratio between the ring gear 534 and the drive pinion 532 on a rear-wheel side to set the rear-wheel-side rotation speed R at the time of connection larger by 3% or more than the front-wheel-side rotation speed F.

In FIG. 15B, to represent cuttable-off conditions of the first disengaging mechanism 520, directions of the torque acting on the first disengaging mechanism 520 at the time of cut-off are classified depending on the difference in running pattern and tire's dynamic radius, and are shown as conditions. In FIG. 15B, as with FIG. 15A, in a torque direction table 608, as running patterns, magnitudes of the tire slip of the front wheel and the rear wheel are classified as "large", "small", and "none", and cornering radiuses are classified as "forward", "large", and "small". Also, magnitudes of tire's dynamic radiuses of the front wheel and the rear wheel are classified as states of "front wheel>rear wheel", "front wheel=rear wheel", and "front wheel<rear wheel". In each condition, the direct ion of the torque is represented as a coast torque C and a drive torque D, or a zero torque Z where no torque acts. Here, the coast torque C is a torque from right-front wheel 602, and the drive torque D is a torque from the engine 528 via the driving-force transmitting unit 516.

Also, when each torque is further larger, that is represented as a coast torque CC or a drive torque DD. As described above, to allow cut-off of the first disengaging mechanism 520 with a small force, it is a necessary condition that the direction of the torque acting on the first disengaging mechanism 520 at the time of the start of cut-off be either one of the drive torque D and the zero torque Z.

Therefore, in the torque direction table 608, portions of "C" and "CC" where this condition is not satisfied are displayed as hatched. According to the torque direction table 608, except the state in which the tire slip of the rear wheel is "large" allowing cut-off in any state of the tire's dynamic radius, all cases in which the tire's dynamic radius is such that "front wheel<rear wheel" are displayed as hatched, and cut-off is not possible. Thus, when the tire's dynamic radius is such that "front wheel<rear wheel", if the torque is at least "Z", desirably "D", the first disengaging mechanism 520 can be cut off with a small force, except the state in which the tire slip of the front wheel with "CC" is "large" and the state in which the cornering radius is "small". Here, as evident from comparison between the rotation speed table 606 of FIG. 15A and the torque direction table 608 of FIG. 15B, when the direction of the torque acting on the first disengaging mechanism 520 is "D", the front-wheel-side rotation speed F and the rear-wheel-side rotation speed R are such that "F<R".

Similarly, "C" corresponds to "F>R", and "Z" corresponds to "F≈R". Therefore, the conditions for cutting off the first disengaging mechanism 520 are the same as those for connection. Thus, when the tire's dynamic radius is such that "front wheel<rear wheel", at least "F≈R", desirably "F<R", is enough. By constructing the change gear ratio between the front and rear wheels so that the rear-wheel-side rotation speed R is larger than the front-wheel-side rotation speed F, the first disengaging mechanism 520 can be cut off with a small force, except the state in which the tire slip of the front wheel with "CC" is "large" and the state in which the cornering radius is "small".

While the description of the embodiments now ends, the present invention is not restricted to the above-described embodiments, includes appropriate modifications not impairing its objects and advantages, and further is not restricted by the numerical values in the above-described embodiments.

What is claimed is:

1. A driving-force transmitting apparatus for a four-wheel-drive vehicle capable of switching between a four-wheel drive mode of transmitting a driving force to front wheels and rear wheels and a two-wheel drive mode of transmitting the driving force only to the front wheels, the apparatus comprising:

a front-wheel differential device that distributes and outputs a driving force input from an engine to left-front and right-front wheels;

a driving-force transmitting unit that transmits the driving force from the engine via the front-wheel differential device to the rear wheels;

a rear-wheel differential device that distributes and outputs the driving force input from the driving-force transmitting unit to left-rear and right-rear wheels;

a first disengaging mechanism that cuts off and connects a joint between the front-wheel differential device and the driving-force transmitting unit;

a second disengaging mechanism that cuts off and connects a joint between the rear-wheel differential device and at least one of the left-rear and right-rear wheels and has a synchronizing mechanism that synchronizes a rotation of a driving-force transmitting unit side and a rotation of an opposing side at the time of connection; and a control unit that connects the first disengaging mechanism and the second disengaging mechanism to transmit the driving force from the engine to the left-rear and right-rear wheels in the four-wheel drive mode, and cuts off the first disengaging mechanism and the second disengaging mechanism to stop a rotation of the driving-force transmitting unit in the two-wheel drive mode, wherein the driving-force transmitting unit configures a change gear ratio between the front and rear wheels so that the driving-force transmitting unit side of the first disengaging mechanism rotates at a speed higher than that of the opposing side with the first disengaging mechanism being cut off at the time of completion of synchronization of the second disengaging mechanism, and in switching from the two-wheel drive mode to the four-wheel drive mode, the control unit first starts synchronization of the second disengaging mechanism to increase a rotation speed of the driving-force transmitting unit, and next connects the first disengaging mechanism when a difference in rotation speed between the driving-force transmitting unit side of the first disengaging mechanism and the opposing side is decreased to a predetermined range.

2. The transmitting apparatus according to claim 1, wherein
with the first disengaging mechanism being cut off, at the time of completion of connection of the second disengaging mechanism, a difference in dynamic radius between the front and rear wheels is cancelled out, and a change gear ratio between the front and rear wheels is further configured so that the driving-force transmitting unit side of the first disengaging mechanism rotates at a speed higher than that of the opposing side.

3. The transmitting apparatus according to claim 1, wherein
the first disengaging mechanism is an engaging clutch mechanism that switches between release and coupling with an operation of a first actuator,
the second disengaging mechanism is a multi-plate clutch mechanism that successively changes a transmission torque between release and coupling with an operation of a second actuator, or an engaging clutch mechanism that has a synchronizing mechanism of a friction clutch scheme and switches between release and coupling with an operation of the second actuator, and
the control unit controls the first and second disengaging mechanisms by operating the first and second actuators.

4. The transmitting apparatus according to claim 3, wherein the control unit
first operates, in switching from the two-wheel drive mode to the four-wheel drive mode, the second actuator to match a rotation speed of the driving-force transmitting unit side of the first disengaging mechanism with a rotation speed of the opposing side, and then, with the rotation speeds being matched each other, operates the first actuator to connect the first disengaging mechanism.

5. The transmitting apparatus according to claim 3, wherein
the driving-force transmitting unit includes a coupling that successively changes the transmission torque by operating a third actuator, and
in switching from the two-wheel drive mode to the four-wheel drive mode, the control unit first operates the second actuator to connect the second disengaging mechanism, next operates a third actuator to match a rotation speed of the driving-force transmitting unit side of the first disengaging mechanism with a rotation speed of the opposing side, and next, with the rotation speeds being matched each other, operates the first actuator to connect the first disengaging mechanism.

6. The transmitting apparatus according to claim 5, wherein the first disengaging mechanism includes
a shift rod that moves, in a reciprocating manner, between a released position and a coupled position of the engaging clutch mechanism with an operation of the first actuator,
a shift fork slidably fitting in the shift rod, restrained with respect to a movement in a coupling direction of the shift rod, and free with respect to a movement in a direction of releasing the shift rod,
a spring that always presses the shift fork in a direction of releasing of the engaging clutch mechanism, and
a coupling sleeve engaging with the shift fork to move, in a reciprocating manner, between the released position and the coupled position of the engaging clutch mechanism,
with a movement of the shift rod to the coupled position, the shift fork is integrally moved against a pressing force of the spring to cause the coupling sleeve to couple the engaging clutch mechanism, and
with a movement of the shift rod to the released position, the shift fork is set free and the coupling sleeve is pressed in the released direction with the spring and, when a torque acting on the coupling sleeve is decreased and a force of restraining the coupling sleeve becomes below a pressing force of the spring in a releasing direction, the coupling sleeve moves to the released position to release the engaging clutch.

7. A driving-force transmitting apparatus for a four-wheel-drive vehicle capable of switching between a four-wheel drive mode of transmitting a driving force to front wheels and rear wheels and a two-wheel drive mode of transmitting the driving force only to the front wheels, the apparatus comprising:
a front-wheel differential device that distributes and outputs a driving force input from an engine to left-front and right-front wheels;
a driving-force transmitting unit that transmits the driving force from the engine via the front-wheel differential device to the rear wheels;
a rear-wheel differential device that distributes and outputs the driving force input from the driving-force transmitting unit to a left-rear and right-rear wheels;
a second disengaging mechanism that cuts off and connects a joint between the front-wheel differential device and the driving-force transmitting unit and synchronizes a rotation of a driving-force transmitting unit side and a rotation of an opposing side at the time of connection;
a first disengaging mechanism that cuts off and connects a joint between the rear-wheel differential device and at least one of the left-rear and right-rear wheels; and
a control unit that connects the first disengaging mechanism and the second disengaging mechanism to transmit the driving force from the engine to the left-rear and right-rear wheels in the four-wheel drive mode, and cuts off the first disengaging mechanism and the second disengaging mechanism to stop a rotation of the driving-force transmitting unit in the two-wheel drive mode, wherein
the driving-force transmitting unit configures a change gear ratio between the front and rear wheels so that the driving-force transmitting unit side of the first disengaging mechanism rotates at a speed higher than that of the opposing side with the first disengaging mechanism being cut off at the time of completion of synchronization of the second disengaging mechanism, and in switching from the two-wheel drive mode to the four-wheel drive mode, the control unit first starts synchronization of the second disengaging mechanism to increase a rotation speed of the driving-force transmitting unit, and next connects the first disengaging mechanism when a difference in rotation speed between the driving-force transmitting unit side of the first disengaging mechanism and the opposing side is decreased to a predetermined range.

8. The transmitting apparatus according to claim 7, wherein with the first disengaging mechanism being cut off, at the time of completion of connection of the second disengaging mechanism, a difference in dynamic radius between the front and rear wheels is cancelled out, and a change gear ratio between the front and rear wheels is further configured so that the driving-force transmitting unit side of the first disengaging mechanism rotates at a speed higher than that of the opposing side.

9. The transmitting apparatus according to claim 7, wherein the first disengaging mechanism is an engaging clutch mechanism that switches between release and coupling with an operation of a first actuator, the second disengaging mechanism is a multi-plate clutch mechanism that successively changes a transmission torque between release and coupling with an operation of a second actuator, or an engaging clutch mechanism that has a synchronizing mechanism of a friction clutch scheme and switches between release and coupling with an operation of the second actuator, and the control unit controls the first and second disengaging mechanisms by operating the first and second actuators.

10. The transmitting apparatus according to claim 9, wherein the control unit first operates, in switching from the two-wheel drive mode to the four-wheel drive mode, the second actuator to match the rotation speed of the driving-force transmitting unit side of the first disengaging mechanism with the rotation speed of the opposing side, and then, with the rotation speeds being matched each other, operates the first actuator to connect the first disengaging mechanism.

11. The transmitting apparatus according to claim 9, wherein the driving-force transmitting unit includes a coupling that successively changes the transmission torque by operating a third actuator, and in switching from the two-wheel drive mode to the four-wheel drive mode, the control unit first operates the second actuator to connect the second disengaging mechanism, next operates a third actuator to match a rotation speed of the driving-force transmitting unit side of the first disengaging mechanism with a rotation speed of the opposing side, and next, with the rotation speeds being matched each other, operates the first actuator to connect the first disengaging mechanism.

12. The transmitting apparatus according to claim 11, wherein the first disengaging mechanism includes a shift rod that moves, in a reciprocating manner, between a released position and a coupled position of the engaging clutch mechanism with an operation of the first actuator, a shift fork slidably fitting in the shift rod, restrained with respect to a movement in a coupling direction of the shift rod, and free with respect to a movement in a direction of releasing the shift rod, a spring that always presses the shift fork in a direction of releasing of the engaging clutch mechanism, and a coupling sleeve engaging with the shift fork to move, in a reciprocating manner, between the released position and the coupled position of the engaging clutch mechanism, with a movement of the shift rod to the coupled position, the shift fork is integrally moved against a pressing force of the spring to cause the coupling sleeve to couple the engaging clutch mechanism, with a movement of the shift rod to the released position, the shift fork is set free and the coupling sleeve is pressed in the released direction with the spring and, when a torque acting on the coupling sleeve is decreased and a force of restraining the coupling sleeve becomes below a pressing force of the spring in a releasing direction, the coupling sleeve moves to the released position to release the engaging clutch.

13. A driving-force transmitting apparatus for a four-wheel-drive vehicle capable of switching between a four-wheel drive mode of transmitting a driving force to front wheels and rear wheels and a two-wheel drive mode of transmitting the driving force only to the rear wheels, the apparatus comprising:

a rear-wheel differential device that distributes and outputs a driving force input from an engine to left-rear and right-rear wheels;

a second disengaging mechanism that receives the driving force input from the engine and successively changes an output to the front wheels between cut-off and connection;

a driving-force transmitting unit that transmits a driving force from the second disengaging mechanism to the front wheels;

a front-wheel differential device that receives the driving force input from the driving-force transmitting unit for distribution and output to left-front and right-front wheels;

a first disengaging mechanism that cuts and connects a joint between the front-wheel differential device and at least one of the left-front wheel and the right-front wheel; and a control unit that connects the first disengaging mechanism and the second disengaging mechanism to transmit the driving force from the engine to the left-front and right-front wheels in the four-wheel drive mode, and cuts off the first disengaging mechanism and the second disengaging mechanism to stop a rotation of the driving-force transmitting unit in the two-wheel drive mode, wherein the driving-force transmitting unit configures a change gear ratio between the front and rear wheels so that a driving-force transmitting unit side of the first disengaging mechanism rotates at a speed higher than that of an opposing side with the first disengaging mechanism being cut off at the time of completion of connect ion of the second disengaging mechanism, and in switching from the two-wheel drive mode to the four-wheel drive mode, the control unit first starts connection of the second disengaging mechanism to increase a rotation speed of the driving-force transmitting unit, and next connects the first disengaging mechanism when a difference in rotation speed between the driving-force transmitting unit side of the first disengaging mechanism and the opposing side is decreased to a predetermined range.

14. The transmitting apparatus according to claim 13, wherein
with the first disengaging mechanism being cut off, at the time of completion of connection of the second disengaging mechanism, a difference in dynamic radius between the front and rear wheels is cancelled out, and a change gear ratio between the front and rear wheels is further configured so that the driving-force transmitting unit side of the first disengaging mechanism rotates at a speed higher than that of the opposing side.

15. The transmitting apparatus according to claim 13, wherein
the first disengaging mechanism is an engaging clutch mechanism that switches between release and coupling with an operation of a first actuator,
the second disengaging mechanism is a multi-plate clutch mechanism that successively changes a transmission torque between release and coupling with an operation of a second actuator, or an engaging clutch mechanism that has a synchronizing mechanism of a friction clutch scheme and switches between release and coupling with an operation of the second actuator, and
the control unit controls the first and second disengaging mechanisms by operating the first and second actuators.

16. The transmitting apparatus according to claim 15, wherein the control unit
first operates, in switching from the two-wheel drive mode to the four-wheel drive mode, the second actuator to match a rotation speed of the driving-force transmitting unit side of the first disengaging mechanism with a rotation speed of the opposing side, and then, with the rotation speeds being matched each other, operates the first actuator to connect the first disengaging mechanism.

17. The transmitting apparatus according to claim 15, wherein
the driving-force transmitting unit includes a coupling that successively changes the transmission torque by operating a third actuator, and
in switching from the two-wheel drive mode to the four-wheel drive mode, the control unit first operates the second actuator to connect the second disengaging mechanism, next operates a third actuator to match a rotation speed of the driving-force transmitting unit side of the first disengaging mechanism with a rotation speed of the opposing side, and next, with the rotation speeds being matched each other, operates the first actuator to connect the first disengaging mechanism.

18. The transmitting apparatus according to claim 15, wherein the first disengaging mechanism includes
a shift rod that moves, in a reciprocating manner, between a released position and a coupled position of the engaging clutch mechanism with an operation of the first actuator,
a shift fork slidably fitting in the shift rod, restrained with respect to a movement in a coupling direction of the shift rod, and free with respect to a movement in a direction of releasing the shift rod,
a spring that always presses the shift fork in a direction of releasing of the engaging clutch mechanism, and
a coupling sleeve engaging with the shift fork to move, in a reciprocating manner, between the released position and the coupled position of the engaging clutch mechanism,
with a movement of the shift rod to the coupled position, the shift fork is integrally moved against a pressing force of the spring to cause the coupling sleeve to couple the engaging clutch mechanism,
with a movement of the shift rod to the released position, the shift fork is set free and the coupling sleeve is pressed in the released direction with the spring and, when a torque acting on the coupling sleeve is decreased and a force of restraining the coupling sleeve becomes below a pressing force of the spring in a releasing direction, the coupling sleeve moves to the released position to release the engaging clutch.

19. The transmitting apparatus according to claim 18, wherein
in switching from the four-wheel drive mode to the two-wheel drive mode, the control unit first acts a torque from the driving-force transmitting unit on the first disengaging mechanism, then operates the first actuator to move the shift rod to the released position, and next operates the second actuator to start cutting off the second disengaging mechanism, and
the first disengaging mechanism has the engaging clutch released when a direction of the torque acting on the coupling sleeve is transformed.

* * * * *